United States Patent [19]
Yamada et al.

[11] Patent Number: 5,635,267
[45] Date of Patent: Jun. 3, 1997

[54] OPTICAL INFORMATION RECORDING MEDIUM OF PHASE CHANGE TYPE HAVING VARIABLY GROOVED TRACKS DEPENDING ON THEIR RADIAL LOCATIONS

[75] Inventors: Noboru Yamada, Hirakata; Kenichi Nishiuchi, Moriguchi; Shigeaki Furukawa, Nara; Nobuo Akahira, Yawata; Eiji Ohno, Hirakata; Kenichi Nagata, Nishinomiya; Rie Kojima, Kashihara, all of Japan

[73] Assignee: Matsushita Electric Industrial Co., Ltd., Kadoma, Japan

[21] Appl. No.: 264,496

[22] Filed: Jun. 23, 1994

Related U.S. Application Data

[63] Continuation-in-part of Ser. No. 122,014, Sep. 16, 1993, abandoned.

[30] Foreign Application Priority Data

| Sep. 17, 1992 | [JP] | Japan | 4-247459 |
| Oct. 19, 1992 | [JP] | Japan | 4-279902 |
| Jun. 25, 1993 | [JP] | Japan | 5-154700 |

[51] Int. Cl.$^6$ ..................... B32B 3/02
[52] U.S. Cl. .......... 428/64.4; 428/689; 428/697; 428/913; 369/283; 369/288; 346/76.1; 346/135.1
[58] Field of Search ............ 428/64, 195, 913, 428/914, 689, 192, 697; 369/275.2, 283, 288; 430/270, 526; 358/128.5; 346/76.1, 135.1

[56] References Cited

U.S. PATENT DOCUMENTS

| 4,222,071 | 9/1980 | Bell et al. | 358/128.5 |
| 4,587,209 | 5/1986 | Ohno et al. | 430/526 |
| 5,118,541 | 6/1992 | Yamamoto et al. | 428/64 |
| 5,124,232 | 6/1992 | Nakanisji et al. | 430/270 |
| 5,309,427 | 5/1994 | Matsumoto | 369/275.2 |

FOREIGN PATENT DOCUMENTS

| 2033740A | 2/1990 | Japan . |
| 2094045A | 4/1990 | Japan . |

OTHER PUBLICATIONS

Sand et al., Patent Abstract of Japan 04–105226, Apr. 1992, vol. 16, No. 348.

*Primary Examiner*—William A. Krynski
*Attorney, Agent, or Firm*—McDermott, Will & Emery

[57] ABSTRACT

In an optical information recording medium such that a recording layer undergoing an optically detectable phase change by absorbing a laser beam is formed on a transparent substrate having geometrically concavo-convex groove tracks concentrically or spirally formed on its surface, the shapes of the groove tracks are variably determined continuously or stepwise depending on the material of the substrate, the structure of the recording layer, and the radial locations of the tracks so that the thermal diffusivity of heat generated in the recording layer becomes larger in an inner part than in an outer part whereby the differences of recording characteristics between in an inner part and in an outer part are suppressed, and the effective recording area is enlarged. There is also disclosed an optical information recording medium having outer zone in which the groove width decreases monotonically or stepwise as recording radius decreases and inner zone in which the land width increases monotonically or stepwise as recording radius increases.

32 Claims, 16 Drawing Sheets

3 TRACK (GROOVE)

3 TRACK (GROOVE)

11 RECORDING AREA

11 RECORDING AREA

OPTICAL INFORMATION RECORDING MEDIUM OF PHASE CHANGE TYPE HAVING VARIABLY GROOVED TRACKS DEPENDING ON THEIR RADIAL LOCATIONS

This is a Continuation-In-Part of U.S. Ser. No. 08/122,014 filed on Sep. 16, 1993, now abandoned.

BACKGROUND OF THE INVENTION

1. Field of the Invention

The present invention relates to an optical information recording medium and a disk substrate used for it such that an information signal of high signal quality is recorded by irradiating a thin film of reversible phase change material formed on a substrate with a high energy beam such as a laser beam.

2. Description of the Related Art

There is known a technique that forms spiral or concentric concavo-convex tracks (called groove tracks hereafter) on the surfaces of an optically smooth double-sided disk substrate of resin or glass. There is also known a technique that constructs a recording medium using a disk having these groove tracks.

In a recording medium of this type, the precision of recording and reproduction is increased by retaining a light beam used for recording and reproduction on a predetermined position along an above groove track (e.g. in a groove or on a part between neighboring grooves called land). In general, if light is made incident on a recording medium having groove tracks, the light reflected from a concave part and the light reflected from a convex part have the optical phase difference twice as long as the depth of the concavo-convex surface. Therefore, if the depth of the groove tracks is set so that the two reflected rays weaken each other, then the returning light has a minimum intensity if it is reflected on a neighborhood of the boundary between the concave and convex parts, and the reflecting light increases as it is reflected on a place farther from the boundary. Therefore, by detecting the intensity of the returning light, the position of the light beam is detected, so that retaining (tracking) the light beam on a land or in a groove can be achieved. Servo technology including this tracking technique is described, for example, in *Hikari disuku gijutsu handobukku* published by Nikkei-Mcgraw.

A byproduct of using grooved tracks is thermal effects described in Japanese patent Heisei 2-10492 (U.S. Pat. No. 4,385,303). That is, since the cross section of the recording film is thinner in the slope part than in the bottom part of a groove or on a land, heat is harder to diffuse in the slope part. Consequently, the efficiency of the laser beam used for recording is increased.

As for the shapes of groove tracks, prior techniques have formed groove tracks having the same groove depth, the same groove width, and the same groove pitch all over the disk to obtain the same tracking signal and the same reflectance regardless of the locations of the groove tracks.

As a method of forming groove tracks on a resin substrate, the following method is known. First, the method spin-coats a smooth glass disk with ultraviolet-hardening resin as thick as the groove depth and cuts groove track information including an address signal by radiating an Ar laser beam. If the lands are to be made the recording part, two laser beams are used to record information such as addresses between grooves ie. on a land while cutting a groove. After developing this plate, the method removes the non-hardened parts by etching, sputters the plate with a nickel thin film, plates it with a thick nickel film, and removes from the glass disk the rest of its layers to obtain a metal stamper as a master plate, so that groove tracks are formed by injection-press molding using this master plate.

As a method of forming groove tracks on a metal plate or a glass plate, a method referred to the 2P method deposits ultraviolet-hardening resin on a substrate, and hardens the resin by irradiating ultraviolet light while pressing the surface with an above stamper. Another method called the sol-gel method is also known. These methods of making a disk substrate having groove tracks are described in detail in *Hikari disuku*, edited by Denki-joho-tsushin gakkai, Ohm, pp 47–48, *Zoku.Wakariyasui hikari disuku*, Optronics, pp 143–194, *Hikari disuku gijutsu handobukku*, Nikkei-Mcgraw, p 14–15, and *Hikari-disuku-yo zairyo gijutsu*, CMC Electronics series, pp 130–134, and etc.

Among known recording thin film materials formed on a surface of groove tracks are phase change recording materials such as Ge—Sb—Te and In—Sb—Te that apply reversible phase-changing between the amorphous and crystalline states and are used as recording thin films at heat mode. There are also magneto-optical recording materials that are composed of rare earth elements and transition elements and apply the detection of the spin of a vertically magnetized film using Kerr effects. There are also Te-based inorganic material films or organic pigment films in which pits are made for recording and reproduction. If these thin films are irradiated with a laser beam, then the physical and chemical characteristics of an irradiated part change to cause an optical change. Only one-time recording can be made in pit recording, but phase change material and magneto-optical material can make the above change reversibly, so that recorded information can be replaced. In rewritable recording, dielectric thin film layers are formed on both sides of the recording film to enhance repeatability, to reduce external influences, and to enhance recorded signals. There have been also reports on increased light absorption in the recording layer by adding a reflecting layer and using the reflecting layer as a heat sink layer as well. The material technology is described, for example, in *Hikari-disuku-yo zairyo gijutsu*, CMC Electronics series. Generally each layer is formed to have a uniform composition and film thickness throughout the substrate.

However, as described in the following, prior optical information recording media described above have different recording conditions between an inner part and an outer part of the disk, so that it is difficult to realize equivalent recording characteristics in both inner and outer parts. For a disk-shaped optical information recording medium such as an optical disk to have large memory capacity, it is necessary to use an area of the disk as large as possible from its outer to inner part. However, memory requiring high-speed random access such as a disk for storing data files is driven by the CAV method (the driving system that keeps the revolution of disks constant). Therefore, the relative linear velocity between the optical head and the disk medium (called simply linear velocity hereafter) proportionately increases with the radial location of recording. If the size d of a light beam is constant, the heating time τ is uniquely determined by the linear velocity v as τ=d/v. Therefore, if the difference of radial locations between an inner part and an outer part is made great to enlarge the recording area, obtaining equivalent recording characteristics in both the inner and outer parts becomes difficult, since the irradiation time changes.

The above problem is described in more detail in the following. In order to change a recording film of a phase change material from the crystalline phase into the amorphous phase, a crystalline part is locally heated at a temperature beyond the melting point and rapidly cooled to freeze its random atomic arrangement. Therefore, heat must be diffused at a proper rate, after the recording film is heated beyond its melting point (See, e.g. N. Yamada et al. Jpn. J. Appl. Phys. Suppl. 26–4, 61(1987)). Since heat tends to be accumulated in an inner part of a disk, where irradiation time is comparatively long, special care must be taken to ensure that necessary cooling conditions for amorphizing be satisfied in an inner part. However, if a rapidly cooling structure is taken to satisfy amorphizing conditions for an inner part with very low linear velocity (e.g. a few m/sec), then temperature is hard to increase in an outer part with linear velocity several times greater, and recording power becomes insufficient.

Conversely, in order to change the recording film from the amorphous phase into the crystalline phase, an amorphous part is kept heated at a temperature beyond its crystallizing temperature (below its melting point) to recover the order of an atomic arrangement. Therefore, the temperature has to be kept at that temperature for more than a predetermined time period. Even the fastest phase change material obtained so far requires at least a few 10 ns of heating time for crystallizing. Therefore, if the linear velocity becomes a few 10 m/sec, then the irradiation time becomes equivalent to the heating time for crystallizing, so that crystallization is hard to achieve. Therefore, a structure reducing thermal diffusion (gradually cooling structure) has to be taken to prolong the time for keeping at beyond the crystallizing temperature. However, in that structure, an inner part with the linear velocity a few 1/10 times as fast as an outer part (e.g. a few m/s) does not satisfy the rapid cooling conditions. That is, in some irradiated part, a liquid part is recrystallized (ie. an amorphous part becomes smaller), so that recording signal amplitude decreases. Therefore, if the difference of radial locations between an inner part and an outer part is sufficiently large, then recording performance decreases either in an inner part or in an outer part. In other words, a recording medium allowing a sufficiently large difference of linear velocities has been hard to make.

In order to compensate the difference of recording characteristics between an inner and outer parts, prior methods of changing the thickness and composition of a recording film or a heat sink layer between an inner and outer parts (thickening in outer parts) were proposed. However, changing thickness and composition depending on locations has a problem with respect to reproducibility. In particular, in a recording medium having multilayer structure, which is already in practice, a few percent of change in film thickness brings a large difference of recording characteristics, so that these methods are not appropriate for mass production.

The Japanese patents Heisei 2-33740 and Heisei 2-94045 proposed magneto-optical recording disks driven by a CAV method such that groove width is varied depending on the linear velocity changing with radial track locations, so that recording power and erasing power are controlled to be constant.

However, the above proposals are limited to magneto-optical recording type, and if groove width is varied in inverse proportion to the linear velocity, then the rate of change in groove width becomes too large to be practical. Moreover, if the power is constant, then tracking performance in an outer part decreases, so that groove width in an outer part has to be made sufficiently large to maintain tracking performance, and consequently the improvement of recording density becomes hard to achieve.

SUMMARY OF THE INVENTION

The first object of the present invention is therefore to provide a means of compensating for the difference of recording characteristics that occurs owing to the difference of locations when an optical information recording medium of phase change type is driven at constant revolution. The second object is to provide a recording medium that makes greater efficiency possible in using recording surfaces.

In order to achieve the aforementioned objective, the present invention provides an optical information recording medium having a transparent substrate on which tracks are continuously formed, each consisting of a land and a groove, a rewritable recording film deposited on the transparent substrate which undergoes a reversible phase change responding to the heat of a laser beam, and a reflecting layer which is formed in parallel with the recording film and reflects the laser beam back into the recording film. The recording medium is driven at constant angular velocity during recording and reproduction. According to one feature of the present invention, the reflecting layer is formed to be a thermal diffusion layer, and the cross sections of the tracks are determined depending on their radial locations in such a way as thermal diffusivity in an inner part is greater than in an outer part.

The recording thin film layer has preferably a uniform composition and film thickness to simplify the manufacturing process. A phase change material is used for the recording thin film layer, which is formed by a sputtering or vapor deposition method.

In case of repeating rewriting, a dielectric material layer is preferably formed between the recording thin film layer and the substrate or on top of the recording thin film layer or in both places to protect the substrate and recording layer from heat damage.

Further, adding a thermal radiation layer to the recording layer can effectively diffuse the heat occurring on a laser irradiated part. This thermal radiation layer is placed at the opposite side of the recording thin film layer from its side on which the laser beam is incident. That is, if the laser beam is made incident on the substrate side, the recording thin film layer is first formed, and the thermal radiation layer is formed over it. If the laser beam is made incident on the recording film side, then the thermal radiation layer is first formed, and the recording thin film layer is formed over it.

If a reflecting layer is used as a thermal radiation layer as well, the way of changing the widths of the grooves or the lands depends on the direction of laser beam incidence. Suppose the laser beam is incident on the substrate side. If information is recorded in the grooves, then the grooves in an inner part are made wider than the grooves in an outer part. If information is recorded on the lands, then the lands in an inner part are made narrower than the lands in an outer part. Conversely, suppose the laser beam is incident on the recording layer side. If information is recorded in the grooves, then the grooves in an inner part are made narrower than the grooves in an outer part. If information is recorded on the lands, then the lands in an inner part are made wider than the lands in an outer part.

A substrate of the present invention has concentric or spiral grooves formed on its one or two sides with geometrically concavo-convex structure. The widths of the grooves and the lands are continuously or stepwise varied from the innermost part to the outermost part.

The changing of groove width is made by controlling the power of laser irradiation for cutting groove information in the mastering process. By rotating a disk substrate at constant revolution and continuously increasing or decreasing the laser power from an inner to an outer part, a master disk having continuously increasing or decreasing groove width from an inner to an outer part is obtained, and copies of the master disks are obtained by replication.

Disks having varying land width can be obtained by replication after making a stamper having opposite concavo-convex form called mother from a master disk made by the above mastering process.

Preferably, disks having varying land width are made from a master disk. In this case the power of the laser beam is made constant, and feed pitch is gradually increased or decreased to continuously change groove width while keeping land width constant.

Preferably, the groove track area is divided into several concentric zones, and the width of an information recording part, which is a groove or a land, is made constant in one zone. The width of the information recording part is varied zone to zone monotonously increased or decreased from outer zones to inner zones. Both groove width and land width may increase or decrease at the same time, or one of them may increase and the other may decrease.

Preferably, a plurality of concentric zones divided from the whole track area of a disk are further classified into outer and inner areas and recording and reproducing by laser irradiation is done only for lands in the outer area while it is done only for grooves in the inner area. The land width in the outer area is varied monotonically, zone to zone or zones to zones monotonically increased from outer zones to inner zones and the groove width in the inner area is varied monotonically or zone to zone monotonically decreased from outer zones to inner zones.

Groove width G and land width L may be independently determined, but the pitch G+L is preferably made constant to make manufacturing easy. Further, if information is recorded both in the grooves and on the lands, and widths of the groove and land adjacent to each other are chosen so that the thermal diffusivity of the groove for heat generated in the recording layer and that of the land are equal to each other, then the radial recording density is determined by the width G+L. Therefore, in that case, if land width L and groove width G are varied too much, the recording density decreases. For these reasons, the ratios G/L and L/G are preferably at most 1.5, and the ratios I/O and O/I of inner part width I and outer part width O are preferably at most 1.5. However, if information is recorded only in the grooves or on the lands, then the above restrictions are not necessary.

If both sides of a substrate is used for recording, the shapes of groove tracks on the two sides are preferably formed symmetric with respect to the substrate. Also, if the laser beam is made incident on the substrate side, the substrate should be made of a transparent resin or glass. Further, if the recording disk has a large diameter, then the substrate material is preferably made of a material having a large rigidity such as a metal.

If a laser beam irradiates a recording medium of the present invention, then the recording thin film layer undergoes temperature-up and phase-changing by absorbing the laser light, and generated heat diffuses from an irradiated part to a surrounding part. However, since the cross section of the recording thin film layer becomes smaller in each edge part (slope part) of a groove track than in the bottom part or the land part, heat diffusion through the recording thin film layer is reduced in the edge part. Therefore, if a recording medium does not have a thermal diffusion layer, if information is recorded in the grooves, and if recorded marks become larger close to the groove width, then heat tends to accumulate inside the groove, and the temperature of the recording part is hard to decline. Therefore, when the linear velocity is large so that the time for giving energy by the laser irradiation is short, then groove width should be made smaller to allow heat to accumulate. Conversely, when the linear velocity is small so that heat tends to accumulate to have bad effects such as doing damage to the recording film, then groove width should be made greater. The above thing is also true for land width, when information is recorded on the lands. If the recording medium is driven at constant revolution (CAV method), the greater the diameter, the difference of the linear velocities between an inner and an outer part becomes greater. That is, in an inner part, the irradiation time becomes comparatively long, so that temperature easily increases but, heat accumulates to do thermal damage to the recording part. On the other hand, in an outer part, the irradiation time becomes comparatively short, so that temperature is hard to increase and sensitivity tends to decrease. Therefore, a groove in an inner part of a recording disk is made wider to rapidly diffuse heat generated by laser irradiation, and a groove in an outer part is made narrower to accumulate heat.

If a thermal diffusion layer is formed to effectively diffuse heat, then things are different. Thermal diffusion occurs from any part of the recording thin film layer in any directions, but the greatest heat flow seems to be from the above edge parts toward the thermal diffusion layer made of material having large thermal conductivity such as metal. FIG. 1A shows a cross section of a recording medium having a recording thin film layer and a thermal diffusion layer such that light is made incident from the substrate side. If information is recorded on the lands, then, as shown by arrows in FIG. 1, the distance between recording layer and the thermal diffusion layer is shortest at the edge parts of a land, through which heat most easily escapes. If the dielectric layer between the recording thin film layer and the thermal diffusion layer is thinner as in FIG. 1B, then the distance between the recording thin film layer and the thermal diffusion layer becomes shorter, and paths of heat diffusion become wider as shown by arrows, so that thermal diffusion through the edge parts becomes further great.

Therefore, in land recording, if the diffusion distance (the heat generated by recording light travels to reach the edge parts) is shorter, and therefore, land width is smaller, then cooling ability becomes higher. Therefore, land width is made narrower in an inner part than in an outer part. In this way uniform recording and erasing characteristics can be obtained.

FIGS. 1C and 1D show the case where light is made incident on the recording layer side as opposed to the case shown in FIGS. 1A and 1B. By a parallel argument of the above description, if information is recorded in the grooves, then the distance between recording layer and the thermal diffusion layer is shortest at the edge parts of a groove, through which heat most easily escapes, as shown by arrows. If the dielectric layer between the recording thin film layer and the thermal diffusion layer is thinner as in FIG. 1D, then the distance between the recording thin film layer and the thermal diffusion layer becomes shorter, and paths of heat diffusion become wider as shown by arrows, so that thermal diffusion through the edge parts becomes further great. Therefore, in groove recording, if the diffusion distance (the heat generated by recording light travels to reach the edge parts) is shorter, and therefore, groove width is smaller, then cooling ability becomes higher. Therefore, groove width is made narrower in an inner part than in an outer part. In this way uniform recording and erasing characteristics can be obtained.

Thus the present invention can suppress the difference of recording characteristics between an inner part and an outer part, where the linear velocities are different, to provide a recording medium having the same size as and larger capacity than prior ones.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

The preferred embodiments according to the present invention will be described below with reference to the attached drawings.

Figure 1A:
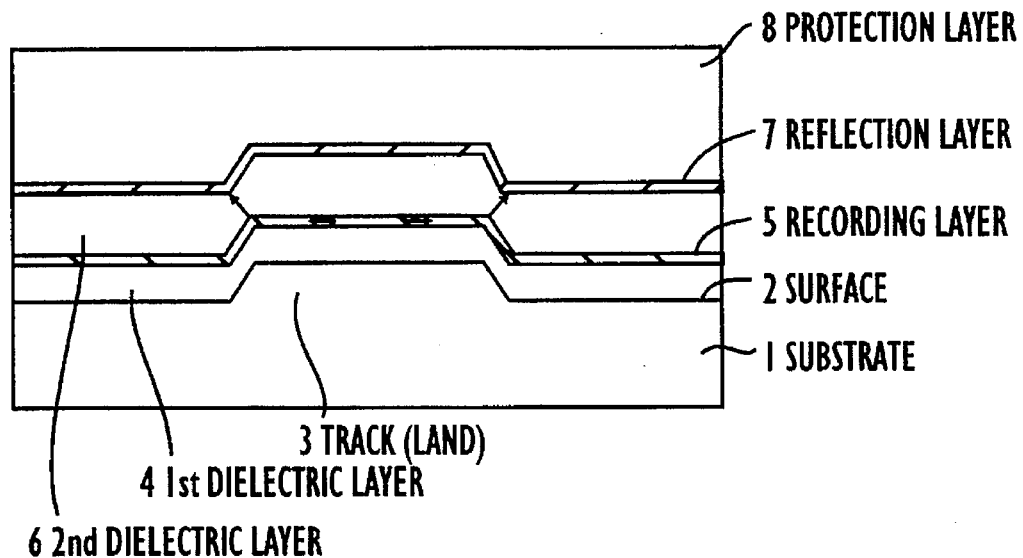
FIGS. 1A, 1B, 1C and 1D show the structures of optical information recording media of an embodiment in lo accordance with the present invention, respectively. These figures show cross sections of the media whose recording layer comprise 4 layers including a recording thin film layer and a thermal diffusion layer. These figures also show how heat generated in the recording layer diffuses toward its surrounding area.
Figure 1B:
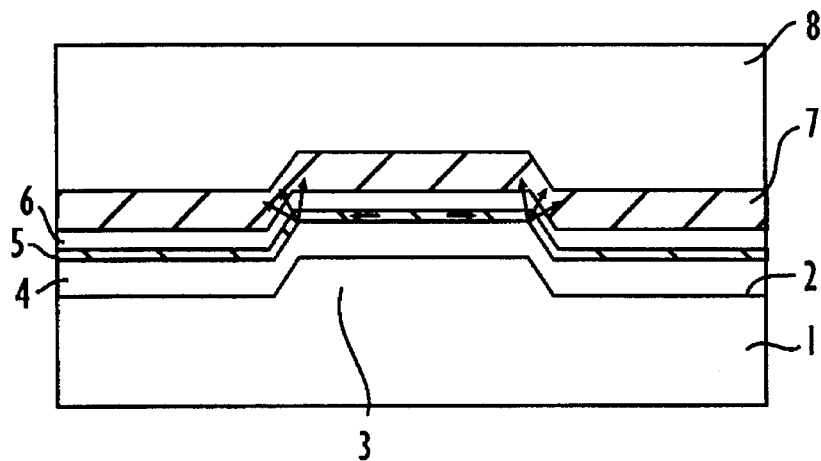
Figure 1C:
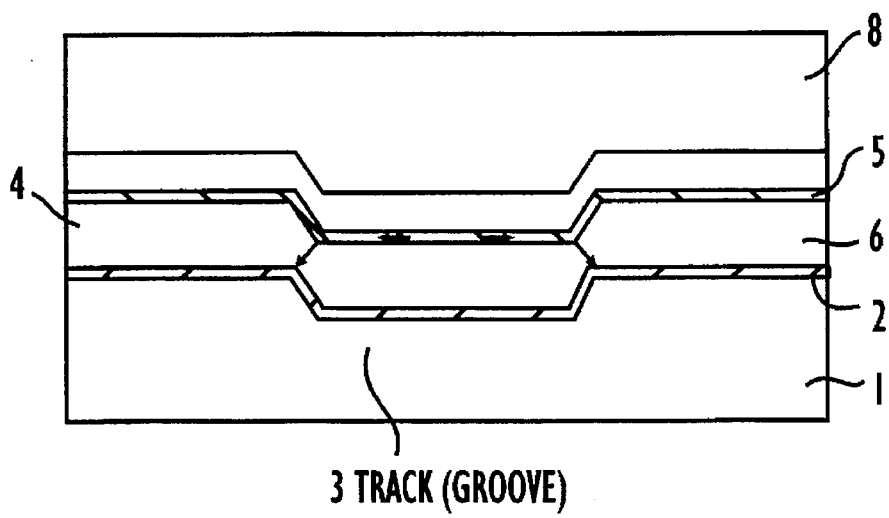
Figure 1D:
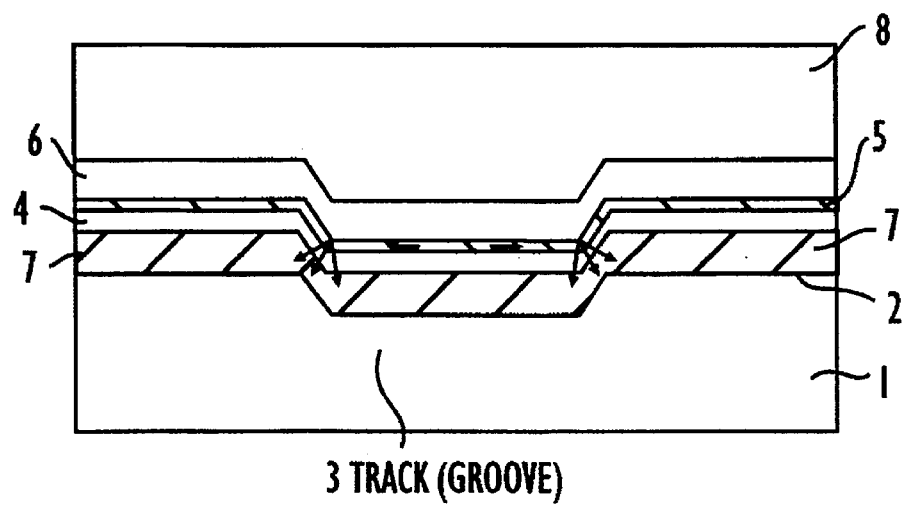
Figure 2:
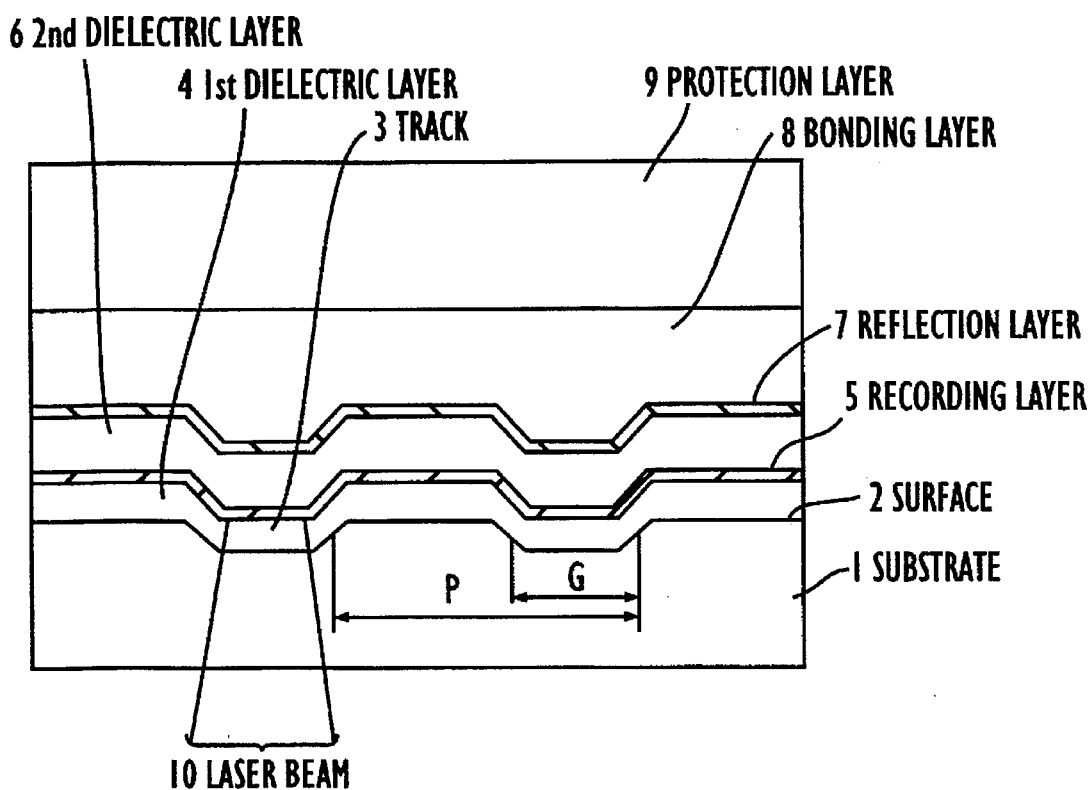
FIG. 2 shows a cross section of an optical information recording medium of an embodiment in accordance with the present invention. This medium is designed for recording in the grooves.

FIG. 2 shows an optical information recording medium of an embodiment in accordance with the present invention. This medium is designed to be an optical disk for recording in the grooves. The figure shows the structure of the medium in a cross section perpendicular to a groove track. A substrate 1 of the present embodiment is a disk, on a surface 2 of which are formed continuous spiral (possibly concentric) groove tracks 3 having concave-convex structure. The disk is 300 mm in outside diameter and 35 mm in inside diameter. On substrate 1 are successively formed a first dielectric layer 4, a recording layer 5 made of a phase change material, a dielectric layer 6, and a reflecting layer 7 made of a metal thin film, and these layers are protected by a protecting plate 9 through an adhesive layer 8. The phase change material reversibly changes its optical characteristics between the crystalline state and the amorphous state by laser irradiation. If a material having high thermal conductivity is used as reflecting layer 7, it also functions as a thermal diffusion layer. A laser beam 10 is made incident on the substrate side for recording and reproduction.

Figure 3A:
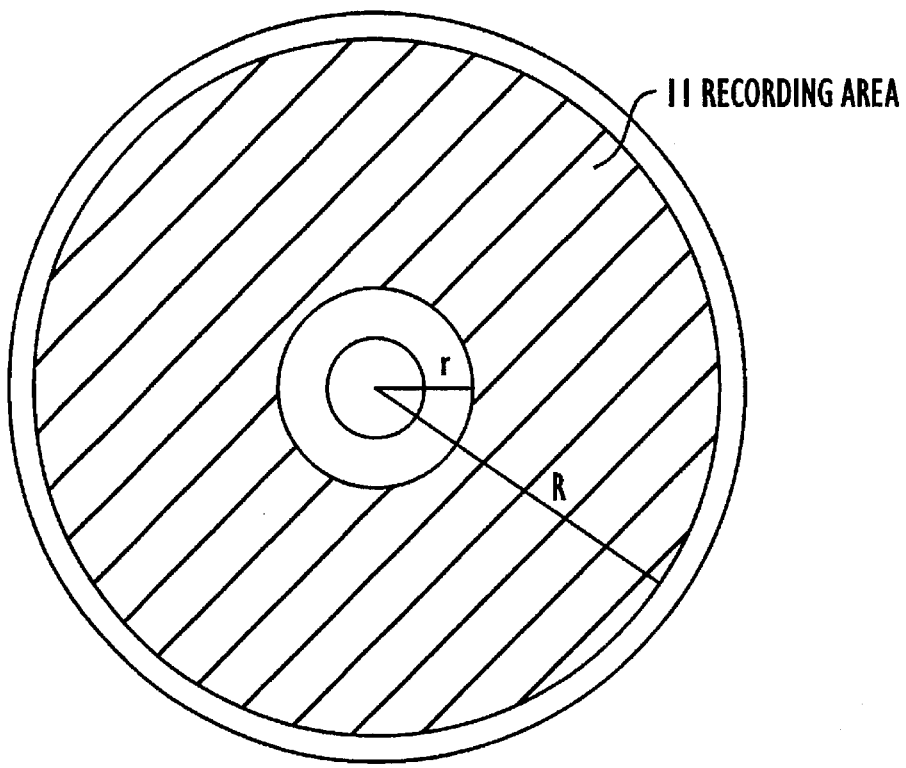
FIG. 3A shows an optical information recording medium of an embodiment viewed from the recording surface side and FIG. 3B shows the relation between the widths and the radial locations of the grooves.
Figure 3B:
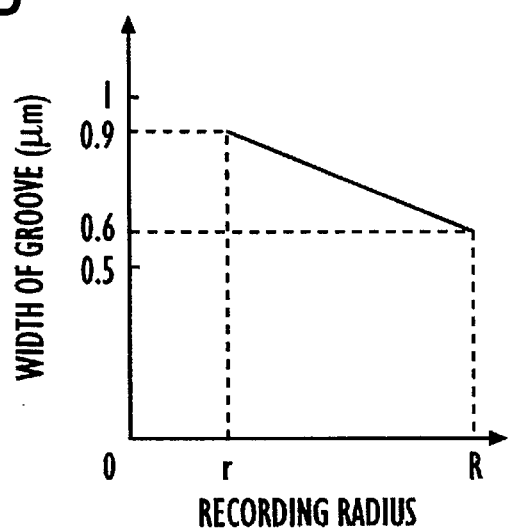
Figure 4A:
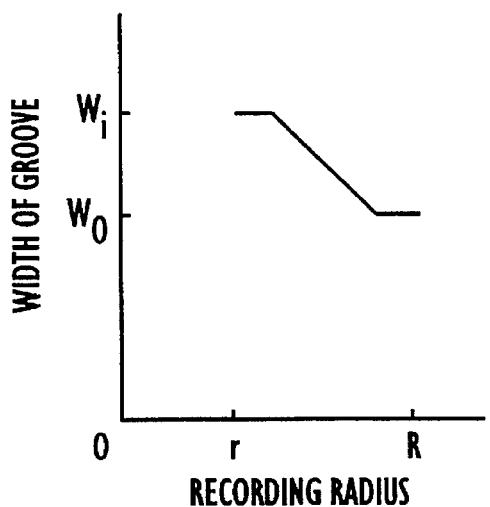
FIGS. 4A, 4B, 4C and 4D show some variations of groove width change in recording in the grooves of an optical information recording medium in accordance with the present invention, respectively.
Figure 4B:
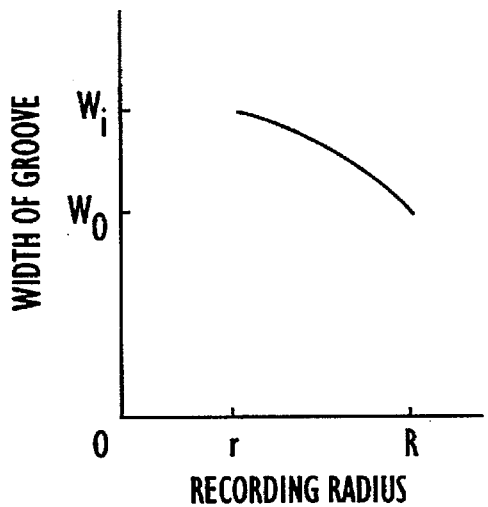
Figure 4C:
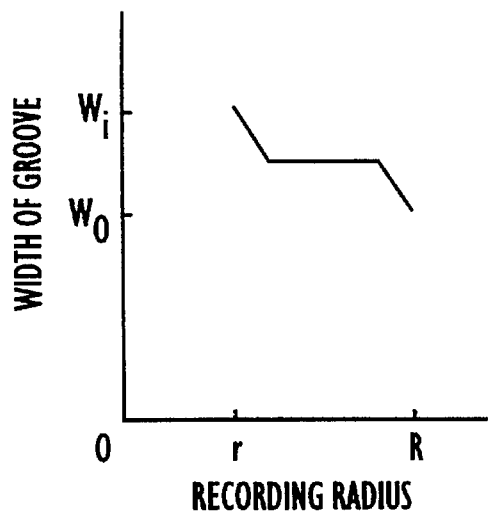
Figure 4D:
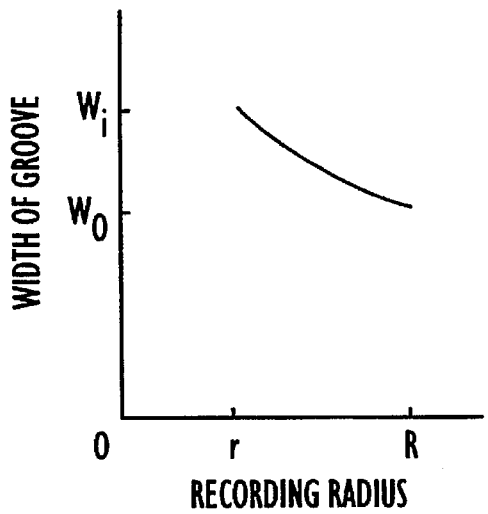

FIG. 3 shows an optical disk medium of the present embodiment viewed from the recording surface side. In FIG. 3, the shaded portion is a recording area 11, in which the pitch p of groove track 3 is constant throughout from the radial location r to the radial location R. Also groove width G is continuously widened from the outermost part to the innermost part. In the present embodiment, p=1.5 µm, G=0.6 µm at the outermost part (radial location 145 mm), and G=0.9 µm at the innermost part (radial location 45 mm). Here, groove width is defined as the length between the middle of a slope and the middle of the other slope of a groove, as shown in FIG. 2.

The change of groove width is not necessarily linear as shown in the graph of FIG. 3. but may be curved or constant in a middle area as shown in FIG. 4. A pattern of the change may be chosen considering recording characteristics of the medium. The actual value of groove width also depends on the wavelength of the laser beam and the NA. of the object lens used in recording and reproducing. The shorter the wavelength and the larger the NA, that is, the smaller the laser spot on the medium is, the smaller the groove width can be made. Therefore, the actual values of groove width are not limited to the values of the present embodiment.

Figure 5A:
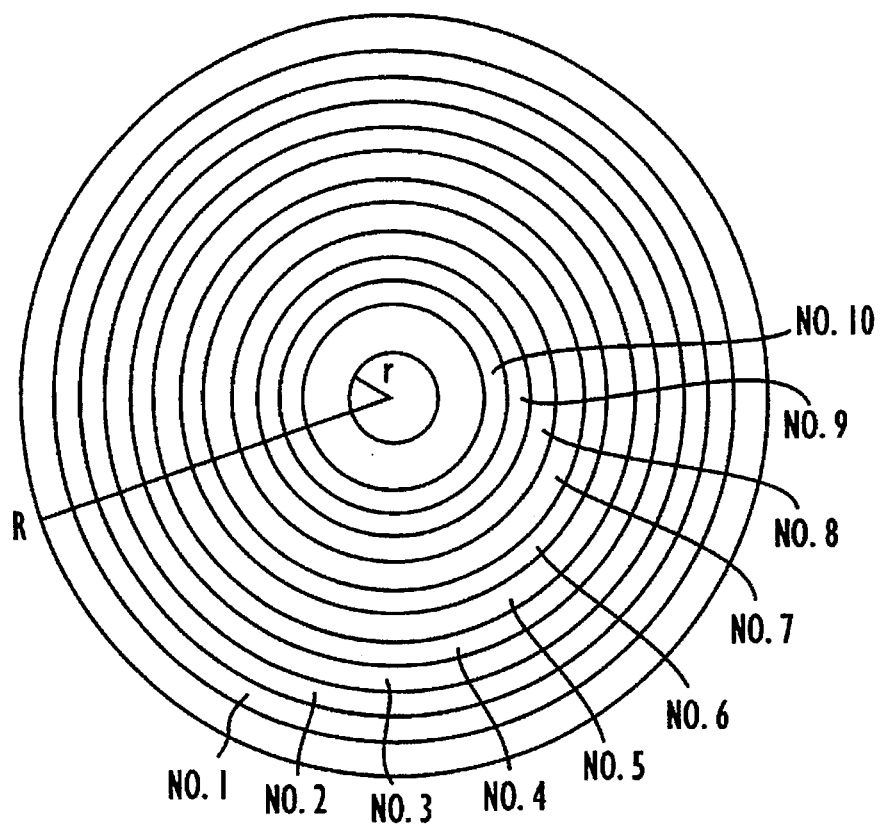
FIG. 5A shows an optical information recording medium of another embodiment viewed from the recording surface side and FIG. 5B shows the relation between groove width and recording zones.
Figure 5B:
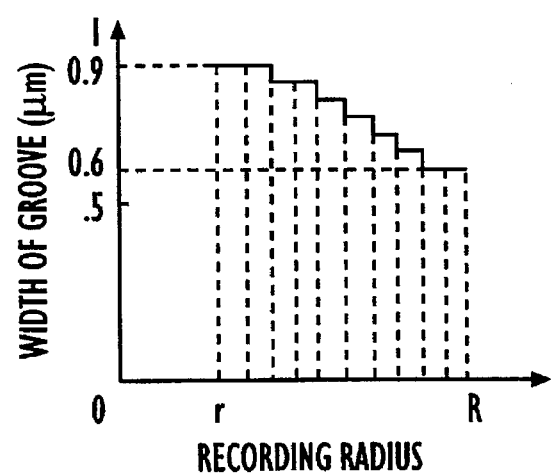

FIG. 5 shows another embodiment viewed from the recording surface side. In this embodiment, the recording surface is divided into several zones, and groove width is constant within each zone. Groove width is changed from zone to zone stepwise. Specifically, the total number of zones is 10, and groove width is decreased stepwise from inner zones to outer zones as shown in Table 1. Zone width and the total number of zones can be arbitrarily set. Also, zone width may be changed from zone to zone.

TABLE 1

Structure of zones and groove width in a prototype optical disk

| Zone number | Area (Radial location) | Groove width |
| --- | --- | --- |
| 1 | 135~145 mm | 0.6 µm |
| 2 | 125~135 mm | 0.6 µm |
| 3 | 115~125 mm | 0.65 µm |
| 4 | 105~115 mm | 0.7 µm |
| 5 | 95~105 mm | 0.75 µm |
| 6 | 85~95 mm | 0.8 µm |
| 7 | 75~85 mm | 0.85 µm |
| 8 | 65~75 mm | 0.85 µm |
| 9 | 55~65 mm | 0.9 µm |
| 10 | 45~55 mm | 0.9 µm |

Varying groove width stepwise as above has various advantages compared with continuous varying, since control can be made zone to zone. In fact, a constant amount of reflected light is detected from within a zone, so that the gain of the servo control needs not be varied in reproduction. Also, recording power may be set constant within each zone in recording.

Figure 6:
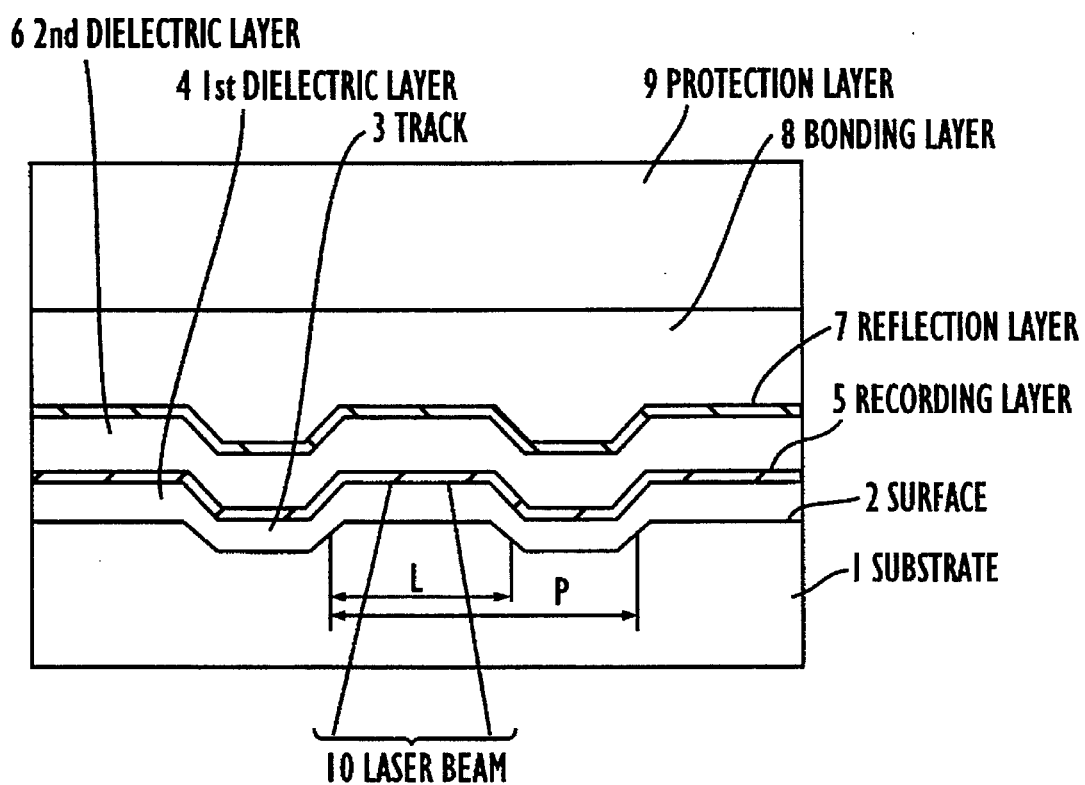
FIG. 6 shows a cross section of an optical information recording medium of an embodiment in accordance with the present invention.

Next, an embodiment such that information is recorded on the lands is described. FIG. 6 shows the structure of the disk medium in a cross section perpendicular to a groove track. In this embodiment, a substrate 1 is a disk 300 mm in outside diameter and 35 mm in inside diameter, on a surface 2 of which are formed continuous spiral (possibly concentric) groove tracks 3 having concavo-convex structure. On substrate 1 are successively formed a first dielectric layer 4, a recording layer 5 made of a phase change material, a dielectric layer 6, and a reflecting layer 7 made of a metal than film, and these layers are protected by a protecting plate 9 through an adhesive layer 8. A laser beam 10 is made incident on the substrate side for recording and reproduction. First and second dielectric layers 4 and 6 are usually made of transparent material for the laser beam and can change the phase of light depending on their thicknesses, so that they may be called phase control layers. They can change the amounts of light reflected from the recording surface and absorbed by recording layer 5 by changing the phase of light. Reflecting layer 7 may be called a thermal diffusion layer, since it functions as a place where heat escapes.

Figure 7A:
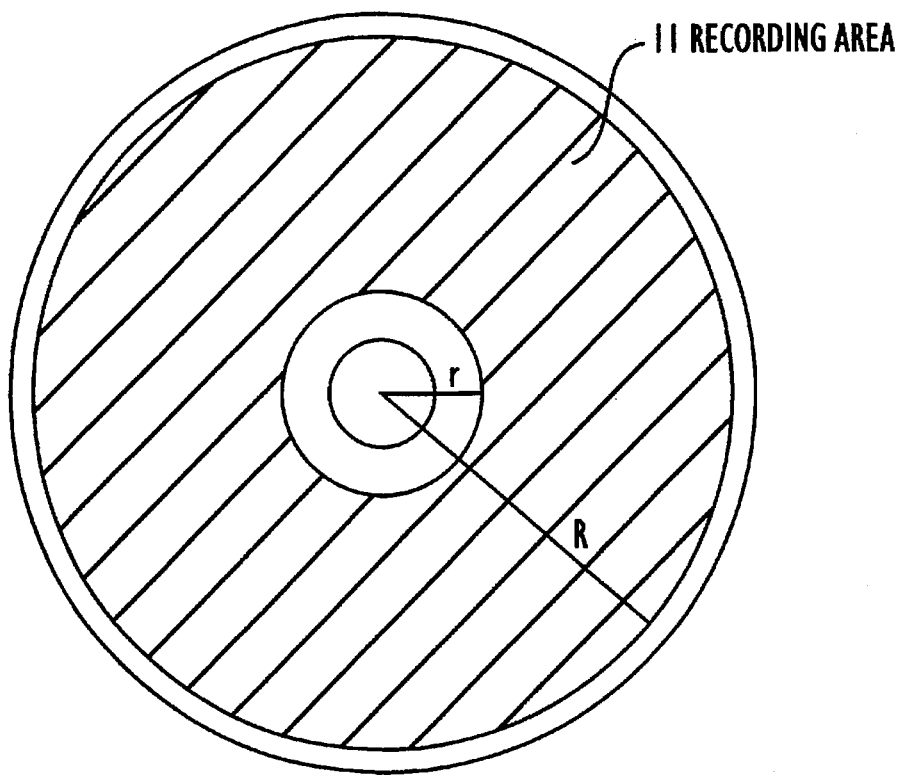
FIG. 7A shows an optical information recording medium of the embodiment of FIG. 6 viewed from the recording surface and FIG. 7B shows the relation between the widths and the radial locations of the lands.
Figure 7B:
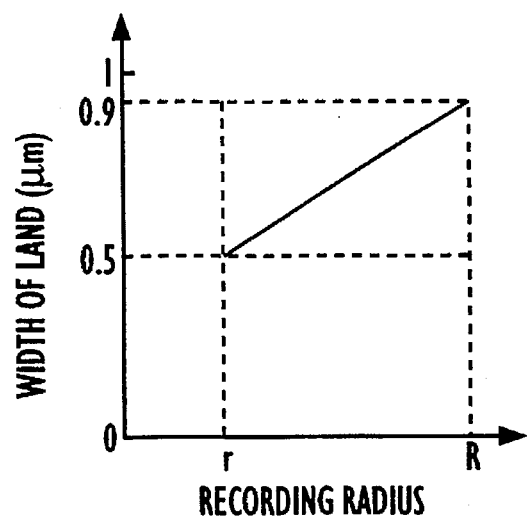
Figure 8A:
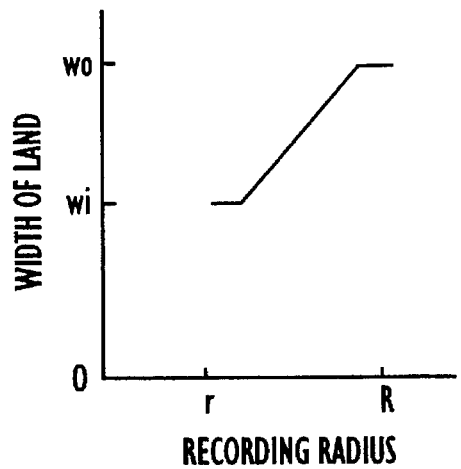
FIGS. 8A, 8B, 8C and 8D show some variations of land width change in recording on the lands of an optical information recording medium in accordance with the present invention.
Figure 8B:
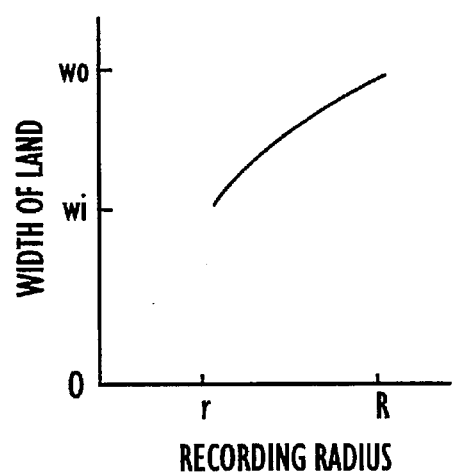
Figure 8C:
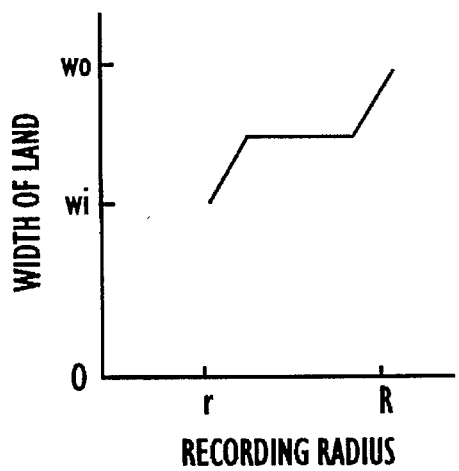
Figure 8D:
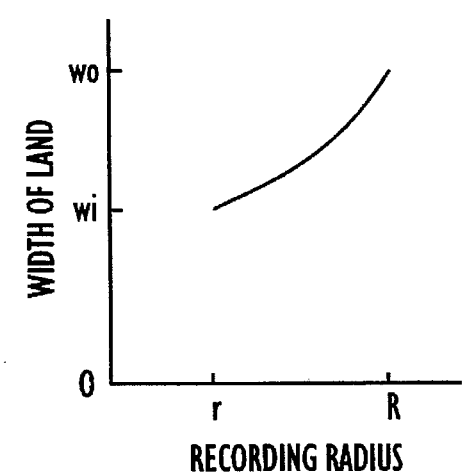

FIG. 7 shows an optical disk medium of the present embodiment viewed from the recording surface side. In FIG. 7, the shaded portion is a recording area 11, in which the pitch p of groove track 3 is constant throughout from the radial location r to the radial location R. Also land width L is continuously widened from the innermost part to the outermost part. In the present embodiment, p=1.5 µm, G=0.6 µm at the outermost part (radial location 145 mm), and G=0.9 µm at the innermost part (radial location 45 mm). Here, land width is defined as the length between the middle of a slope and the middle of the other slope of a land, as shown in FIG. 6.

The change of land width is not necessarily linear as shown in the graph of FIG. 7, but may be curved or constant in a middle area as shown in FIG. 8. A pattern of the change may be chosen considering recording characteristics of the medium. The actual value of land width also depends on the wavelength of the laser beam and the NA of the object lens used in recording and reproducing. The shorter the wavelength and the larger the NA, that is, the smaller the laser spot on the medium is, the smaller the land width can be made. Therefore, the actual values of land width are not limited to the values of the present embodiment.

Figure 9A:
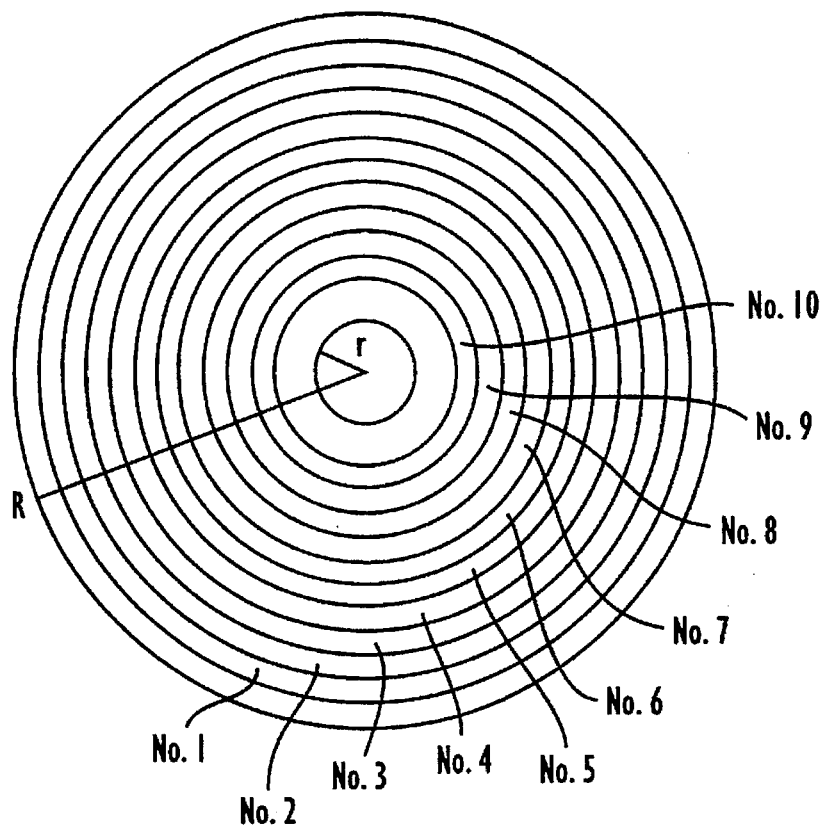
FIG. 9A shows an optical information recording medium of another embodiment viewed from the recording surface side and FIG. 9B shows the relation between land width and recording zones.
Figure 9B:
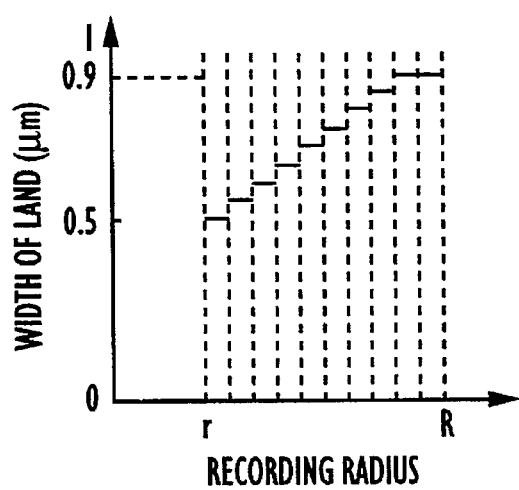
Figure 10A:
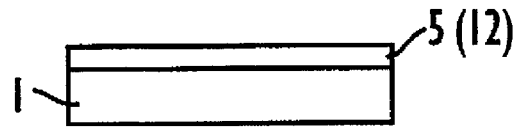
FIGS. 10A, 10B, 10C, 10D, 10E, 10F, 10G and 10H show various structures of the recording layers of optical information recording media in accordance with the present invention, respectively.
Figure 10B:
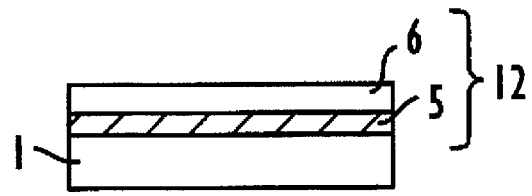
Figure 10C:
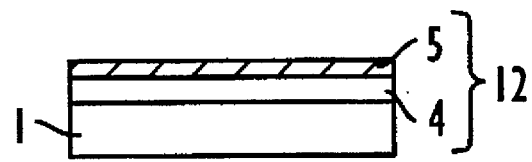
Figure 10D:
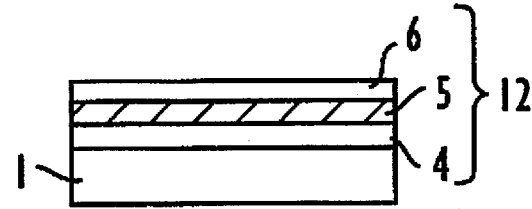
Figure 10E:
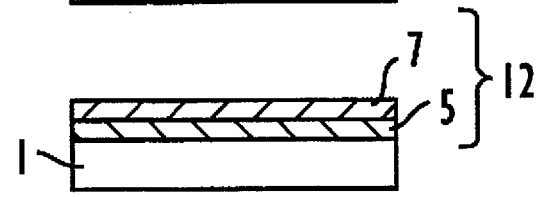
Figure 10F:
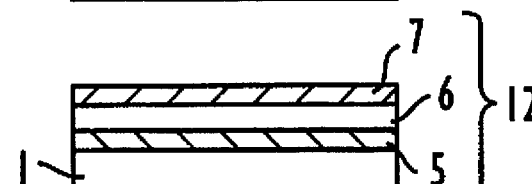
Figure 10G:
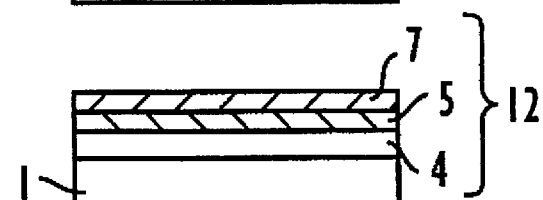
Figure 10H:
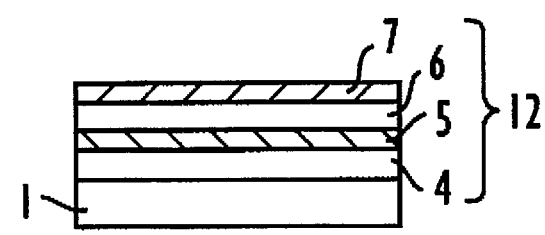

FIG. 9 shows another embodiment viewed from the recording surface side. In this embodiment, the recording surface is divided into several zones, and land width is constant within each zone. Land width is changed from zone to zone stepwise, and the pitch of the groove tracks is made constant throughout. Specifically, the total number of zones is 10, and land width is increased stepwise from inner zones to outer zones as shown in Table 2. Zone width and the total number of zones can be arbitrarily set. Also, zone width may be changed from zone to zone.

TABLE 2

Structure of zones and land width in a prototype optical disk

| Zone number | Area (Radial location) | Land width |
| --- | --- | --- |
| 1 | 135~145 mm | 0.9 µm |
| 2 | 125~135 mm | 0.9 µm |
| 3 | 115~125 mm | 0.85 µm |
| 4 | 105~115 mm | 0.8 µm |
| 5 | 95~105 mm | 0.75 µm |
| 6 | 85~95 mm | 0.7 µm |
| 7 | 75~85 mm | 0.65 µm |
| 8 | 65~75 mm | 0.6 µm |
| 9 | 55~65 mm | 0.55 µm |
| 10 | 45~55 mm | 0.5 µm |

In the above embodiments, recording density is made higher, if the pitch of the groove tracks is made shorter. However, technical restrictions of cutting, injection, and the like limit the minimum pitch to 0.6 µm (groove width 0.2 µm, land width 0.4 µm), practically to 0.8 µm (groove width 0.3 µm, land width 0.5 µm). Restrictions of servo control such as tracking control also limit the maximum pitch to 2 µm (neither of groove and land widths exceed 1.1 µm), practically to 1.8 µm (neither of groove and land widths exceed 1.1 µm).

In the following is described methods of making optical information recording media of the present invention.

Basic methods of making a substrate having concavo-convex groove tracks in accordance with the present invention are as described in *Hikari disuku*, edited by Denki-joho-tsushin gakkai, Ohm, pp 47–48, *Zoku.Wakariyasui hikari disuku*, Optronics, pp 143–194, *Hikari disuku gijutsu handobukku*, Nikkei-Mcgraw, p 14–15, and *Hikari-disuku-yo zairyo gijutsu*, CMC Electronics series, pp 130–134, and etc.

A method of making a substrate having concavo-convex groove tracks of the present invention is divided into a mastering process for making a stamper and a replication process for making replicas from the stamper. The mastering process consists of a polishing process where a surface of a glass disk is polished and washed to have unevenness less than a few µm, a coating process where the polished surface is coated with a photoresist film 40 nm to 100 nm thick (equivalent to groove depth) by spin coating, an exposure process where the glass disk is rotated, and an Ar gas laser beam is fed from the inside to the outside at a feed speed equivalent to the groove pitch and modulated depending on the groove format so that the photoresist surface is exposed to the laser beam, a wet development process where the exposed part is removed to form concavo-convex groove tracks, a plating process where a nickel electrode is spattered on the groove tracks and a metal such as nickel is plated, and a process where the plated stamper is removed from the glass disk. In the replication process, injection molding is performed using the stamper as a master to make a disk substrate having concavo-convex groove tracks.

In the case of making a disk substrate used for the embodiment shown in FIG. 3, the above glass disk coated with a photoresist is rotated by the CLV method (the revolution is controlled to make the linear velocity constant regardless of the radial location), and a groove format is cut with irradiation power continuously increasing from the outermost part to the innermost part at a constant rate, so that groove width continuously increases from the outermost part to the innermost part. The irradiation power is 4 mW for the outermost part and 10 mW for the innermost part.

In the case of making a disk substrate used for the embodiment shown in FIG. 5, the above glass disk coated with a photoresist is rotated by the CLV method (the revolution is controlled to make the linear velocity constant regardless of the radial location), and a groove format is cut with irradiation power stepwise decreasing from the innermost part to the outermost part with a constant power within each zone, so that groove width increases from the outermost zone to the innermost zone. The irradiation power is 10 mW for the innermost zone and 4 mW for the outermost zone.

An address signal is written in the grooves by modulating the above cutting power, so that groove information and direct addresses are written in the grooves.

In the case of making a disk substrate used for the embodiment shown in FIG. 7, the above glass disk coated with a photoresist is rotated by the CLV method, and a groove format is cut with constant feed pitch and irradiation power continuously decreasing from the outermost part to the innermost part at a constant rate, so that groove width is continuously increased from the outermost part to the innermost part. The irradiation power is 4 mW for the outermost part and 10 mW for the innermost part. Since land width is determined by pitch and groove width, land width continuously increases from the innermost to the outermost part.

In the case of making a disk substrate used for the embodiment shown in FIG. 9, the above glass disk coated with a photoresist is rotated by the CLV method, and a groove format is cut with constant feed pitch and irradiation power stepwise decreasing from the innermost part to the outermost part with a constant power within each zone, so that groove width increases from the outermost zone to the innermost zone. Therefore, land width decreases from the outermost to the innermost zone. The irradiation power is 10 mW for the innermost zone and 4 mW for the outermost zone.

An address signal is written on the lands by using two laser beams so that an address signal is written on a land while cutting a groove. Another method is to write an address signal in a groove while cutting the groove, so that after making a stamper, another stamper having the opposite concavo-convex structure is made from the original stamper, and replicas are made using the second stamper.

The multilayer of a recording medium of the present invention is formed as follows. Each layer is deposited by a sputtering apparatus to be used for an ordinary thin film. Sputter gas is Argon gas. The dielectric layers are formed by RF magnetron sputtering, and the metal layer is formed by DC sputtering, but both may be formed by DC sputtering. The ratio of the sputter power to the sputter rate of the target corresponding to each layer is obtained beforehand, and the distribution of film thickness is adjusted to obtain a layer having uniform thickness. Film thickness is determined by a required time period calculated from the sputter rate. Layers are successively deposited from a lower to an upper layer. As a method of forming a thin film, other methods such as electron beam vapor deposition, ion beam sputtering, CVD, ion plating can be used depending on the material of the thin film.

In the present invention, if a recording material of heat mode is used for recording layer 5, the effects are remarkable. In particular, effective results are produced by applying reversible phase-changing between the amorphous and crystalline states, such as a Ge—Sb—Te system, a system obtained by adding Co, Bi, Pd, O, N, Se, and the like to that system or substituting these elements for part of that system, a Sb—Te system, an In—Se system or a system obtained by adding Co and Ti and the like to that system, an In—Sb—Te system, a Ge—Te system, a Ag—Sb—In—Te system, a Ge—Bi—Te system, a Ge—Sn—Te system, a Ge—Bi—Te—Se system, a Ge—Te—Sn—Au system, or a system obtained by adding O and N and the like to one of these systems.

Figure 11A:
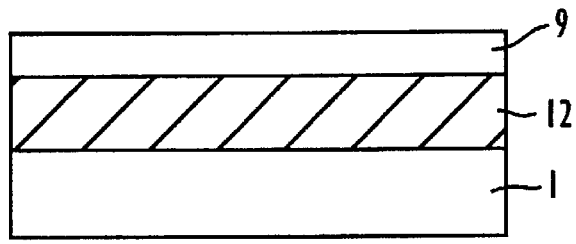
FIGS. 11A, 11B and 11C show a single sided structure and two double sided structures of optical recording media in accordance with the present invention.
Figure 11B:
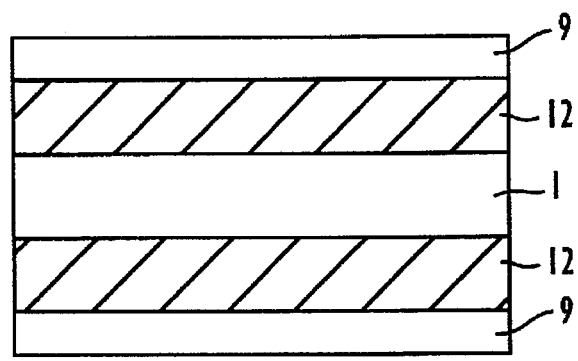
Figure 11C:
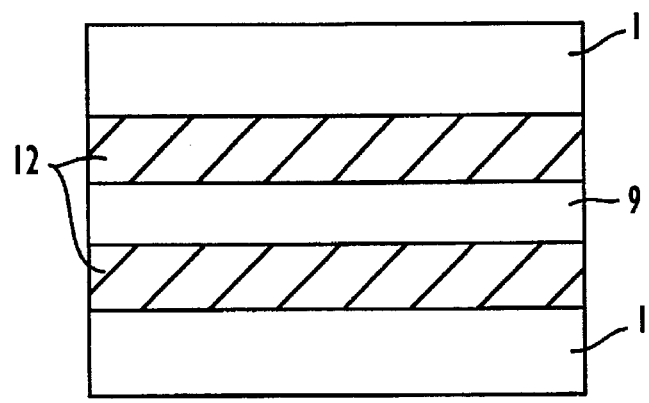

Various structures of recording media are possible as shown in FIGS. 10 and 11. FIG. 10A shows the simplest structure such that a recording thin film is formed on a substrate. FIGS. 10B and 10C show structures such that a dielectric layer is formed on one side of the recording thin film. FIG. 10D shows a structure such that two dielectric layers are formed on both sides of the recording thin film. FIGS. 10E to 10H show structures such that a reflecting layer is added to the above structures FIGS. 10A to 10D. While all of the structures shown in FIG. 10 is a single-plate structure without a protecting layer, FIG. 11A shows a single-plate structure having a protecting layer. FIG. 11B shows a single-plate double-sided structure having protecting layers. FIG. 11C shows a double-plate double-sided structure having protecting layers. A protecting layer can be formed by spin-coating and hardening ultraviolet-hardening resin or can be pasted as shown in FIG. 1. In short, the present invention is independent of the multilayer structure of a recording medium.

Dielectric layers 4, 6 are thin films of oxides Such as SiO, $SiO_2$, $Ta_2O_5$, $TiO_2$, $ZrO_2$, nitrides such as BN, AlN, $Si_3N_4$, TiN, fluorides such as $CAF_2$, LaF, chalcogenides such as ZnS, ZnSe, PbS, carbides such as SiC, diamond, DLC, c-BN, or mixtures of them such as ZnS—$SiO_2$, ZnSe—$SiO_2$, SiNO.

Further, reflecting layer (thermal diffusion laser) 7 is a film of a single metal such as Au, Al, Cu, Ni, Cr, Ti, Si, or an alloy such as Au—Cr, Ni—Cr, Al—Cr, Al—Ti, Al—Ta, Au—Si, Au—Cu—Si. Also, a dielectric material having higher thermal diffusivity can be used as reflecting layer 7. For example, DLC, c-BN, SiC and the like are suitable.

Protecting layer 9 is usually made of the same material as used for the substrate to form a structure having vertical symmetry, but other material may be used. As adhesive layer 8 ultraviolet-hardening resin or hot-melt type material can be used.

Next, experimental results of comparing recording characteristics of recording media of the present invention with those of prior recording media are described.

EXAMPLE 1

In order to compare an optical information recording medium of the present invention with prior ones, three disks having the same structure of the recording layer and different formats of groove tracks were prepared. As a recording medium of the present invention there was prepared an optical disk (disk 1) consisting of 10 zones and having groove width increasing from the outermost zone to the innermost zone as shown in Table 1. As compared disks, there were prepared an optical disk (disk 2) having uniform groove width the same as that of the outermost zone of disk 1 and an optical disk (disk 3) having uniform groove width the same as that of the innermost zone of disk 1. Recording was performed from the substrate side of all of these disks.

A material overwritable by a single laser beam ie. a phase change material made of a ternary alloy of a GeSbTe system, was used as the recording film of the recording media, and the layer structures were the same for all of disks 1, 2, 3 (See Yamada et al. JJP, Vol. 26(1987) Supplement 26-4, p. 61).

Table. 3 shows the layer structure of the prototype disks. On a polycarbonate substrate 1.2 mm thick having groove tracks, there were successively formed a ZnS—$SiO_2$ mixture thin film 92.8 nm thick, a $Ge_2Sb_2Te_5$ ternary alloy thin film 30 nm thick, a ZnS—$SiO_2$ mixture thin film 151 nm thick, and a Au thin film 10 nm thick by sputtering. The top layer was spin-coated with ultraviolet-hardening resin, a polycarbonate protecting plate is pasted over it, and ultraviolet light was radiated on it to finish the disk medium.

Before testing recording characteristics of the above disks, each disk was crystallized (initialization). To achieve the initialization, each disk was driven at linear velocity 5 m/sec by the CLV method (feed pitch was 10 μm/revolution) and was irradiated with a semiconductor laser beam of power 1 W and wavelength 780 nm focused on elliptic spots of their half-value size 5 μm×20 μm with their longitudinal direction agreeing with their radial dictions on the disk.

TABLE 3

| Layer structure of prototype disks | | |
|---|---|---|
| | Material | Thickness |
| Substrate | Polycarbonate | 1.2 mm |
| First laser | ZnS—$SiO_2$ ($SiO_2$: 20 mol %) | 92.8 nm |
| Second layer | $Ge_2Sb_2Te_5$ | 30 nm |
| Third layer | ZnS—$SiO_2$ ($SiO_2$: 20 mol %) | 151 nm |
| Fourth layer | Au | 10 nm |
| Fifth layer | Ultraviolet-hardening resin | 0.1 mm |
| Sixth layer | Polycarbonate | 1.2 mm |

Figure 12:
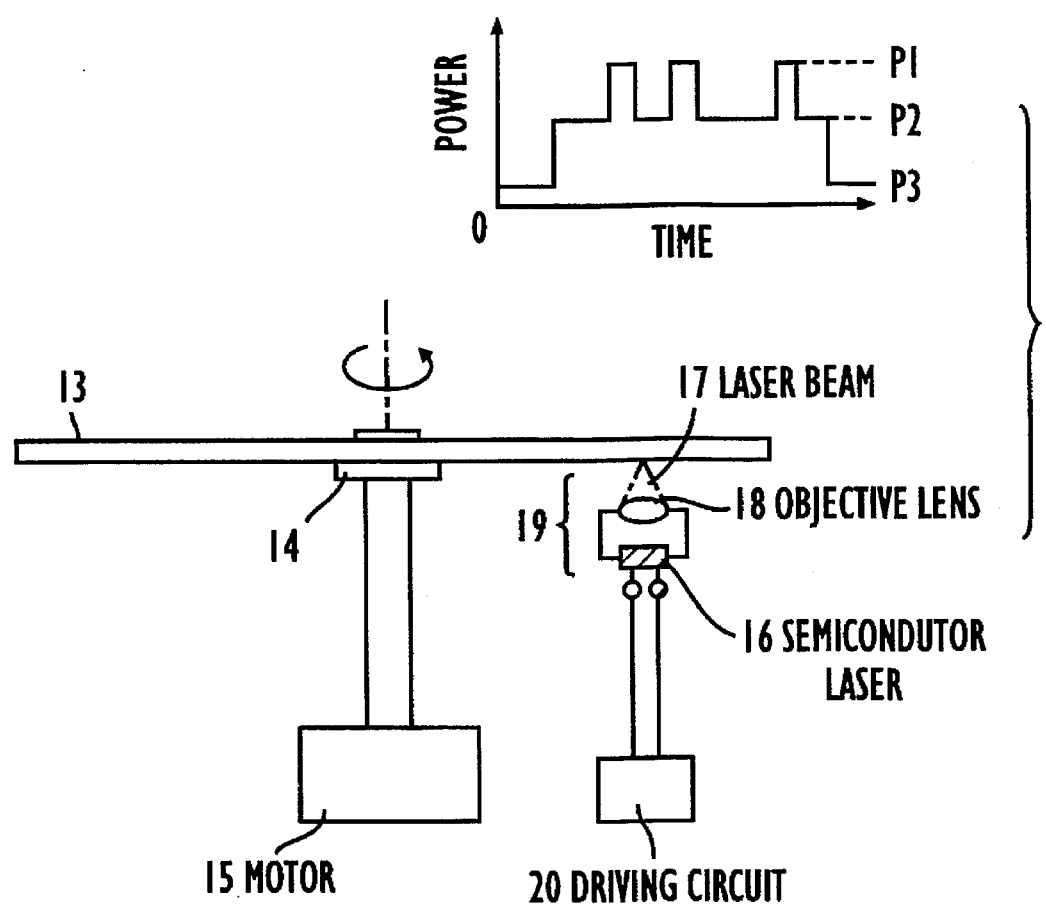
FIG. 12 is a schematic side view for showing a recording and reproducing apparatus which was used for evaluating recording characteristics of optical information recording media of the present invention.

Next, a schematic drawing of the apparatus used for signal recording is shown in FIG. 12. Each prototype disk 13 was fixed on a turn table 14 and rotated by a motor 15 at 1800 revolutions per minute. A laser beam 17 emitted from a semiconductor laser of wavelength 780 nm was focused on the disk by an object lens 18 of NA 0.55. An optical head 19 was equipped with a transfer mechanism and can be moved freely at any radial location between the innermost and the outermost part of the disk. Although not shown in FIG. 12, the head had parts and circuits for magneto-optical recording to be able to record on and reproduce from an magneto-optical medium. Also, the head had a magnet that generates a magnetic field for erasing.

Laser beam 17 was focused and tracked on the recording film of the groove tracks by a prepared servo circuit. The semiconductor laser was connected to a driving circuit 20. The laser power was modulated between a recording power level (amorphizing power level) P1 and an erasing power level (crystallizing power level) P2, so that recording was performed at PPM mode. A reproducing power level P3 was fixed at 1.5 mW, which produces intensity not affecting the recording film. Recording and erasing characteristics were evaluated by the following procedure, where the recording frequency such that the recording pitch of recorded marks in each zone is 1.26 μm is denoted by f1, and the recording frequency such that the recording pitch of recorded marks in each zone is 3.36 μm is denoted by f2.

(1) Recording in a middle part of zone No. 1 was performed. First, a recording power level P1 and an erasing power level P2 were fixed to certain values, an f1 signal was recorded, and the CN ratio was measured. Also, the reflectance of the medium was determined from the integrals of the magnitudes of the focusing error signal and the tracking error signal over a revolution.

(2) Next, an f2 signal was overwritten with the same laser power, and the attenuation ratio of the f1 component and the erasability were measured.

(3) The above steps were repeated 10,000 cycles. If the change of reflectance was less than 10%, and if the CN ratio was more than 50 dB, and if the erasability was more than 20 dB after the repetition, then the judgment OK was passed; otherwise, the judgment NG was passed.

(4) The above combination of laser power levels P1, and P2 was changed into other combinations of values, and the steps (1) to (3) were repeated.

(5) If the set of combinations of laser power levels P1, P2 such that judgment OK was passed in (3) spreads at least over an area of ±10% of certain values of P1 and P2, then evaluation o was given. If the set was an area of values between ±5% and ±10%, then evaluation Δ was given. If the set was an area of values less than ±5%, then evaluation x was given.

(6) Steps (1) to (5) were repeated for zones No. 2 to No. 10.

TABLE 4

| Recording characteristics of prototype disks (1) | | | | | | |
|---|---|---|---|---|---|---|
| | Disk 1 | | Disk 2 | | Disk 3 | |
| Zone Number | Groove width (μm) | Evaluation | Groove width (μm) | Evaluation | Groove width (μm) | Evaluation |
| 1 | 0.6 | o | 0.6 | o | 0.9 | x |
| 2 | 0.6 | o | 0.6 | o | 0.9 | x |
| 3 | 0.65 | o | 0.6 | o | 0.9 | x |
| 4 | 0.7 | o | 0.6 | o | 0.9 | Δ |
| 5 | 0.75 | o | 0.6 | Δ | 0.9 | Δ |
| 6 | 0.8 | o | 0.6 | Δ | 0.9 | Δ |
| 7 | 0.85 | o | 0.6 | Δ | 0.9 | o |
| 8 | 0.85 | o | 0.6 | x | 0.9 | o |
| 9 | 0.9 | o | 0.6 | x | 0.9 | o |
| 10 | 0.9 | o | 0.6 | x | 0.9 | o |

The evaluation results are shown in Table 4. From table 4, it is seen that disk 2 having narrow grooves throughout decreased its performance in inner zones, and that disk 3 having wide grooves throughout decreased its performance in outer zones. On the other hand, disk 1 of the present invention having wider grooves in inner zones than in outer zones achieved good performance throughout from the outermost to the innermost zones.

EXAMPLE 2

Next, an example using a recording thin film of write-once type is described. A groove track made of acrylate resin was formed on a glass substrate 1.2 mm thick and 30 cm in diameter by the 2P method. The thickness of the resin layer was 50 μm, and thermal conditions were the same as a resin substrate. The grooves were 70 nm deep. As a medium of the present invention, two disks on which are formed groove tracks having groove width increasing from the outermost zone (groove width: 0.6 μm) to the innermost zone (groove width: 0.9 μm) at a constant rate were prepared. A $TeO_x$—Au thin film (x=0.8, Au density: 10 at %) was formed on the groove track side of each disk, and these two disks were pasted with their film sides inside with an adhesive to obtain a disk 4. As compared disks, a disk 5 having groove width 0.6 μm throughout and a disk 6 having groove width 0.9 μm throughout were also prepared.

TABLE 5

Recording characteristics of prototype disks (2)

| Radial location (mm) | Disk 1 Groove width (μm) | Evaluation | Disk 2 Groove width (μm) | Evaluation | Disk 3 Groove width (μm) | Evaluation |
|---|---|---|---|---|---|---|
| 140 | 0.615 | o | 0.6 | o | 0.9 | x |
| 130 | 0.645 | o | 0.6 | o | 0.9 | x |
| 120 | 0.675 | o | 0.6 | o | 0.9 | x |
| 110 | 0.705 | o | 0.6 | o | 0.9 | x |
| 100 | 0.735 | o | 0.6 | o | 0.9 | o |
| 90 | 0.765 | o | 0.6 | o | 0.9 | o |
| 80 | 0.795 | o | 0.6 | x | 0.9 | o |
| 70 | 0.825 | o | 0.6 | x | 0.9 | o |
| 60 | 0.855 | o | 0.6 | x | 0.9 | o |
| 50 | 0.885 | o | 0.6 | x | 0.9 | o |

The recording characteristics of the above three disks were compared using the evaluation apparatus described in Example 1. The revolution of each disk was set to 1800 revolutions per minute. The laser beam of wavelength 780 nm was modulated with a frequency so that the mark pitch of recorded marks becomes 1.3 μm. Since this example is a medium of write-once type, the laser beam was modulated between a recording power level and a reproducing power level. Recording and reproducing were performed through the substrate for each disk.

The evaluation of media was based on the measurement of recording power versus the CN ratio. If a power margin of ±20% can be obtained for the CN ratio over 55 dB, the evaluation o was given; otherwise, the evaluation x was given. Table 5 shows the results.

From these results, it is observed that disk 5 having narrow grooves throughout decreased its performance in inner zones, and that disk 6 having wide grooves throughout decreased its performance in outer zones. On the other hand, disk 4 of the present invention having wider grooves in inner zones than in outer zones achieved good performance throughout from the outermost to the innermost zones.

EXAMPLE 3

Next, the recording characteristics of an example of a recording medium such that information is recorded on its lands are described. The evaluation apparatus as above was used, and the same evaluation criteria were adopted as above.

In order to compare an optical information recording medium of the present invention with prior ones, three disks having the same structure of the recording layer and different formats of groove tracks. As a recording medium of the present invention there was prepared an optical disk (disk 7) consisting of 10 zones and having land width decreasing from the outermost zone to the innermost zone as shown in Table 1. For compared media, there were prepared an optical disk (disk 8) having uniform land width the same as that of the outermost zone of disk 7 and an optical disk (disk 9) having uniform land width the same as that of the innermost zone of disk 7. The film structure of the recording media was the same as Example 1 and shown in Table 3. The disks were initialized in a similar way.

Table 6 shows the evaluation results. From these results, it is seen that disk 8 having wide lands throughout decreased its performance in inner zones, and that disk 9 having narrow lands throughout decreased its performance in outer zones. On the other hand, disk 7 of the present invention having wider lands in outer zones than in inner zones achieved good performance throughout from the outermost to the innermost zones.

TABLE 6

Recording characteristics of prototype disks (3)

| Zone Number | Disk 7 Land width (μm) | Evaluation | Disk 8 Land width (μm) | Evaluation | Disk 9 Land width (μm) | Evaluation |
|---|---|---|---|---|---|---|
| 1 | 0.9 | o | 0.9 | o | 0.5 | x |
| 2 | 0.9 | o | 0.9 | o | 0.5 | x |
| 3 | 0.85 | o | 0.9 | o | 0.5 | x |
| 4 | 0.8 | o | 0.9 | o | 0.5 | x |
| 5 | 0.75 | o | 0.9 | Δ | 0.5 | Δ |
| 6 | 0.7 | o | 0.9 | Δ | 0.5 | Δ |
| 7 | 0.65 | o | 0.9 | x | 0.5 | Δ |
| 8 | 0.6 | o | 0.9 | x | 0.5 | o |
| 9 | 0.55 | o | 0.9 | x | 0.5 | o |
| 10 | 0.5 | o | 0.9 | x | 0.5 | o |

EXAMPLE 4

Next, an example of an optical information recording medium of the present invention having a recording thin film of GdTbFeCo is described. Groove tracks made of acrylate resin were formed on a glass substrate 1.2 mm thick and 30 cm in diameter by the 2P method. The thickness of the resin layer was 50 μm, and thermal conditions were the same as a resin substrate. The grooves were 55 nm deep. As a medium of the present invention, two disks on which groove tracks having land width decreasing from the outermost zone (land width: 0.9 μm) to the innermost zone (groove width: 0.5 μm) at a rate were prepared. A ZnS film 60 nm thick, a $Gd_2Tb_{18}Fe_{70}Co_{40}$ thin film 40 nm thick, an Al—Ti thin film 50 nm thick, and an AlN thin film 100 nm thick were formed on the groove track side of each disk, and these two disks were pasted with their film sides inside with an adhesive to obtain a disk 10. As compared disks, a disk 11 having land width 0.9 μm throughout, and a disk 12 having land width 0.5 μm throughout were also prepared. Laser irradiation was performed through the substrate for each disk.

The recording characteristics of the above three disks were compared using the evaluation apparatus described in Example 1. The laser wavelength was set to 780 μm, and the revolution of each disk was set to 1800 revolutions per minute. The laser beam was modulated between a recording power level and a reproducing power level.

The evaluation of each medium was performed as follows, assuming PWM recording (mark edge recording). Recording and erasing characteristics were evaluated by the following procedure, where a recording frequency such that the recording pitch of recorded marks in each zone is 1.5 µm is denoted by f1, and the recording frequency such that the recording pitch of recorded marks in each zone is 4 µm is denoted by f2.

(1) Recording in a middle part of zone No. 1 was performed. First, a recording power level P1 and an erasing power level P2 were independently chosen, an f1 signal was recorded on the lands, and the CN ratio and the DC erasability were measured. If the CN ratio was more than 50 dB, and if the erasability was more than 40 dB, then the judgment OK was passed; otherwise, the judgment NG was passed.

(2) If the judgement was OK, then, with the same power levels, after the recording and erasing of an f2 signal were repeated 1 million times, the recording of an f1 signal was performed, and the CN ratio and the erasability were measured again.

(3) If the CN ratio was more than 50 dB, and if the erasability was more than 40 dB, after the repetition, and if the attenuation of the CN ratio from the initial value was less than 3 dB, then the judgment OK was passed; otherwise the judgment NG was passed.

(4) The above combination of laser power levels P1, and P2 was changed into other combinations of values, and the steps (1) to (3) were repeated.

(5) If the set of combinations of laser power levels P1, P2 such that judgment OK was passed in (3) spreads at least over an area of ±15% of certain values of P1 and P2, then evaluation o was given. If the set was an area of values between ±5% and ±15%, then evaluation Δ was given. If the set was an area of values less than ±5%, then evaluation x was given.

(6) Steps (1) to (5) were repeated for zones No. 2 to No. 10.

The evaluation results are shown in Table 7. In inner zones of disk 11 having wide lands, recorded marks were distorted, and the CN ratio decreased. In outer zones of disk 12 having narrow lands throughout, the CN ratio decreased. On the other hand, disk 10 of the present invention having wider lands in outer zones than in inner zones achieved good performance throughout from the outermost to the innermost zones.

TABLE 7

| | Recording characteristics of prototype disks (4) | | | | | |
|---|---|---|---|---|---|---|
| Radial | Disk 10 | | Disk 11 | | Disk 12 | |
| location (mm) | Land width (µm) | Evaluation | Land width (µm) | Evaluation | Land width (µm) | Evaluation |
| 140 | 0.98 | o | 0.9 | o | 0.5 | x |
| 130 | 0.84 | o | 0.9 | o | 0.5 | x |
| 120 | 0.80 | o | 0.9 | o | 0.5 | x |
| 110 | 0.76 | o | 0.9 | Δ | 0.5 | x |
| 100 | 0.72 | o | 0.9 | Δ | 0.5 | x |
| 90 | 0.68 | o | 0.9 | Δ | 0.5 | Δ |
| 80 | 0.64 | o | 0.9 | x | 0.5 | Δ |
| 70 | 0.60 | o | 0.9 | x | 0.5 | o |
| 60 | 0.56 | o | 0.9 | x | 0.5 | o |
| 50 | 0.52 | o | 0.9 | x | 0.5 | o |

EXAMPLE 5

Next, an example such that information is recorded both in the grooves and on the lands. On a polycarbonate injection substrate 0.6 mm thick having concavo-convex groove tracks on its surface, there were successively formed a ZnS—SiO$_2$ dielectric layer 81 nm thick, a GeSb$_2$Te$_4$ recording thin film 20 nm thick, a ZnS—SiO$_2$ dielectric layer 132 nm thick, and a Au thin film layer 8 nm thick by a sputtering method. Two such disks were pasted with their recording film sides inside with a hot melt adhesive to obtain a disk 13.

The recording area was divided into 10 zones, and groove width and land width in each zone were as shown in Table 8. Groove width increased from outer zones to inner zones, and land width decreased from outer zones to inner zones. The ratio L/G of land width L to groove width G and G/L were at most 1.5. The ratio O/I of the width of an outer groove or land O to the width of an inner groove or land I and I/O were at most 1.5. Pitch G+L was constant.

Converting the evaluation apparatus shown in FIG. 12 to install two optical heads having object lenses of NA 0.6 and using laser beams of wavelength 680 nm, the performance of the above disk was evaluated. The disk was rotated at 3600 revolutions per minute, and information was recorded both in the grooves and on the lands at the same time and reproduced at the same time.

TABLE 8

| Structure of zones and groove/land width in a prototype optical disk | | | |
|---|---|---|---|
| Zone number | Area (radial location) (mm) | Groove width (µm) | Land width (µm) |
| 1 | 124–115.5 | 0.5 | 0.75 |
| 2 | 115.5–107 | 0.55 | 0.7 |
| 3 | 107–98.5 | 0.55 | 0.7 |
| 4 | 98.5–90 | 0.6 | 0.65 |
| 5 | 90–87.5 | 0.6 | 0.65 |
| 6 | 87.5–73 | 0.65 | 0.6 |
| 7 | 73–64.5 | 0.65 | 0.6 |
| 8 | 64.5–56 | 0.7 | 0.55 |
| 9 | 56–47.5 | 0.7 | 0.55 |
| 10 | 47.5–39 | 0.75 | 0.5 |

The evaluation of the medium was performed as follows, assuming PWM recording (mark edge recording). Recording and erasing characteristics were evaluated by the following procedure, where a recording frequency such that the recording pitch of recorded marks in each zone is 1.2 µm is denoted by f1, and the recording frequency such that the recording pitch of recorded marks in each zone is 3.2 µm is denoted by f2.

(1) Recording in a middle part of zone No. 1 was performed. First, a recording power level P1 and an erasing power level P2 were independently chosen, an f1 signal was recorded on the lands, and the CN ratio and the DC erasability were measured. If the CN ratio was more than 50 dB, and if the erasability was more than 26 dB, then the judgment OK was passed; otherwise, the judgment NG was passed.

(2) If the judgement was OK, then, with the same power levels, after the recording and erasing of an f1 signal were repeated ten thousand times, and after the recording and erasing of an f2 signal were repeated ten thousand times, the recording of an f1 signal was performed, and the CN ratio and the erasability were measured again.

(3) If the CN ratio was more than 50 dB, and if the erasability was more than 26 dB, after the repetition, and if the attenuation of the CN ratio from the initial value was less than 3 dB, then the judgment OK was passed; otherwise the judgment NG was passed.

(4) The above combination of laser power levels P1, and P2 was changed into other combinations of values, and the steps (1) to (3) were repeated.

(5) If the set of combinations of laser power levels P1, P2 such that judgment OK was passed in (3) spreads at least over an area of ±10% of certain values of P1 and P2, then evaluation o was given. If the set was an area of values between ±5% and ±10%, then evaluation Δ was given. If the set was an area of values less than ±5%, then evaluation x was given.

(6) Steps (1) to (5) were repeated for zones No. 2 to No. 10.

The results are shown in Table 9. As seen from Table 9, the prescribed characteristics were satisfied both in the grooves and on the lands of the whole area, where the ratio L/G of land width L to groove width G and G/L were at most 1.5, and the ratio O/I of the width of an outer groove or land O to the width of an inner groove or land I and I/O were at most 1.5.

TABLE 9

Recording characteristics of Prototype disk (5)

| Zone No | Area (radial location) (mm) | Evaluation Groove | Land |
|---|---|---|---|
| 1 | 124~115.5 | o | o |
| 2 | 115.5~107 | o | o |
| 3 | 107~98.5 | o | o |
| 4 | 98.5~90 | o | o |
| 5 | 90~87.5 | o | o |
| 6 | 87.5~73 | o | o |
| 7 | 73~64.5 | o | o |
| 8 | 64.5~56 | o | o |
| 9 | 56~47.5 | o | o |
| 10 | 47.5~39 | o | o |

EXAMPLE 6

Next, an example such that the laser beam is made incident on the recording film side. As shown in Table 10, a thermal diffusion layer, a dielectric layer, a recording thin film layer, a dielectric layer were successively deposited on a polycarbonate substrate by a sputtering method. The top layer was coated with ultraviolet-hardening resin about 0.1 mm thick, which was hardened by ultraviolet irradiation to obtain a protecting layer. Information was recorded both in the grooves and on the lands, and groove tracks as shown in Table 11 were formed to obtain a disk 14.

TABLE 10

Layer structure of prototype disks

| | Material | Thickness |
|---|---|---|
| Substrate | Polycarbonate | 1.2 mm |
| First laser | AU | 10 nm |
| Second layer | ZnS—SiO$_2$ (SiO$_2$: 20 mol %) | 92.8 nm |
| Third layer | Ge$_2$Sb$_2$Te$_5$ | 30 nm |
| Fourth layer | ZnS—SiO$_2$ (SiO$_2$: 20 mol %) | 151 nm |
| Fifth layer | Ultraviolet-hardening resin | 0.1 mm |

TABLE 11

Structure of zones and groove/land width in a prototype optical disk

| Zone number | Area (radial location) (mm) | Groove width (μm) | Land width (μm) |
|---|---|---|---|
| 1 | 135~145 | 0.9 | 0.6 |
| 2 | 125~135 | 0.9 | 0.6 |
| 3 | 115~125 | 0.85 | 0.65 |
| 4 | 105~115 | 0.85 | 0.65 |
| 5 | 95~105 | 0.8 | 0.7 |
| 6 | 85~95 | 0.75 | 0.75 |
| 7 | 75~85 | 0.7 | 0.8 |
| 8 | 65~75 | 0.65 | 0.85 |
| 9 | 55~65 | 0.6 | 0.9 |
| 10 | 45~55 | 0.6 | 0.9 |

For comparison of recording characteristics, a disk 15 having the groove tracks the same as the ones in zone 1 of disk 14 throughout and a disk 16 having the groove tracks the same as the ones in zone 10 of disk 14 were also prepared. The evaluation was conducted as in example 1.

TABLE 12

Recording characteristics of prototype disks (6)

| Zone No Radial location | Disk 14 Groove width/ Evaluation | Disk 14 Land width/ Evaluation | Disk 15 Groove width/ Evaluation | Disk 15 Land width/ Evaluation | Disk 16 Groove width/ Evaluation | Disk 16 Land width/ Evaluation |
|---|---|---|---|---|---|---|
| 1 140 mm | 0.9 μm o | 0.6 μm o | 0.9 μm o | 0.6 μm o | 0.6 μm x | 0.9 μm x |
| 2 130 mm | 0.9 o | 0.6 o | 0.9 o | 0.6 o | 0.6 x | 0.9 x |
| 3 120 mm | 0.85 o | 0.65 o | 0.9 o | 0.6 o | 0.6 x | 0.9 x |
| 4 110 mm | 0.85 o | 0.65 o | 0.9 o | 0.6 o | 0.6 Δ | 0.9 o |
| 5 100 mm | 0.8 o | 0.7 o | 0.9 o | 0.6 o | 0.6 Δ | 0.9 Δ |
| 6 90 mm | 0.75 o | 0.75 o | 0.9 o | 0.6 o | 0.6 o | 0.9 o |
| 7 80 mm | 0.7 o | 0.8 o | 0.9 Δ | 0.6 Δ | 0.6 o | 0.9 o |
| 8 70 mm | 0.65 o | 0.85 o | 0.9 x | 0.6 x | 0.6 o | 0.9 o |
| 9 60 mm | 0.6 o | 0.9 o | 0.9 x | 0.6 x | 0.6 o | 0.9 o |
| 10 50 mm | 0.6 o | 0.9 o | 0.9 x | 0 .6 x | 0.6 o | 0.9 o |

Table 12 shows the evaluation results. The compared disks 15 and 16 exceeded the prescribed values only in inner zones or in outer zones. On the other hand, disk 14 satisfied prescribed characteristics both in the grooves and on the lands of its whole area, where the ratio L/G of land width L to groove width G and G/L were at most 1.5, and the ratio O/I of the width of an outer groove or land O to the width of an inner groove or land I and I/O were at most 1.5.

EXAMPLE 7

Next, an example such that groove tracks were directly formed on a glass substrate. Concavo-convex groove tracks 70 nm deep were formed on a surface of a glass substrate 1.2 mm thick and 130 mm in diameter. On the substrate, there were successively formed an Au layer 8 nm thick, a ZnS—SiO$_2$ dielectric layer 132 nm thick, a GeSb$_2$Te$_4$ recording thin film 20 nm thick, and a ZnS—SiO$_2$ dielectric layer 82 nm thick by electron beam vapor deposition. Then, the top layer was spin-coated with ultraviolet-affected resin, which was hardened by ultraviolet irradiation (about 100 μm).

The recording area was divided into 10 zones, and groove width and land width in each zone were as shown in Table 13. Groove width decreased from outer zones to inner zones, and land width increased from outer zones to inner zones. The ratio L/G of land width L to groove width G and G/L were at most 1.5. The ratio O/I of the width of an outer groove or land O to the width of an inner groove or land I and I/O were at most 1.5. Pitch G+L was constant at 0.9 μm.

Converting the evaluation apparatus shown in FIG. 12 to install two optical heads having object lenses of NA 0.55 and using laser beams of wavelength 780 nm, the performance of the above disk was evaluated. The disk was rotated at 3600 revolutions per minute, and information was recorded both in the grooves and on the lands at the same time and reproduced at the same time.

TABLE 13

Structure of zones and groove/land width in a prototype optical disk

| Zone number | Area (radial location) (mm) | Groove width (μm) | Land width (μm) |
|---|---|---|---|
| 1 | 124–115.5 | 0.9 | 0.6 |
| 2 | 115.5–107 | 0.85 | 0.65 |
| 3 | 107–98.5 | 0.85 | 0.65 |
| 4 | 98.5–90 | 0.8 | 0.7 |
| 5 | 90–87.5 | 0.8 | 0.7 |
| 6 | 87.5–73 | 0.75 | 0.75 |
| 7 | 73–64.5 | 0.75 | 0.75 |
| 8 | 64.5–56 | 0.7 | 0.8 |
| 9 | 56–47.5 | 0.65 | 0.85 |
| 10 | 47.5–39 | 0.6 | 0.9 |

TABLE 14

Recording characteristics of prototype disk (7)

| Zone No | Area (radial location) (mm) | Evaluation Groove | Evaluation Land |
|---|---|---|---|
| 1 | 124–115.5 | o | o |
| 2 | 115.5–107 | o | o |
| 3 | 107–98.5 | o | o |
| 4 | 98.5–90 | o | o |
| 5 | 90–87.5 | o | o |
| 6 | 87.5–73 | o | o |
| 7 | 73–64.5 | o | o |
| 8 | 64.5–56 | o | o |
| 9 | 56–47.5 | o | o |
| 10 | 47.5–39 | o | o |

The evaluation of the medium was performed as follows, assuming PWM recording (mark edge recording). Recording and erasing characteristics were evaluated by the following procedure, where a recording frequency such that the recording pitch of recorded marks in each zone is 1.5 μm is denoted by f1, and the recording frequency such that the recording pitch of recorded marks in each zone is 4 μm is denoted by f2.

(1) Recording in a middle part of zone No. 1 was performed. First, a recording power level P1 and an erasing power level P2 were independently chosen, an f1 signal was recorded on the lands, and the CN ratio and the DC erasability were measured. If the CN ratio was more than 50 dB, and if the erasability was more than 26 dB, then the judgment OK was passed; otherwise, the judgment NG was passed.

(2) If the judgement was OK, then, with the same power levels, after the recording and erasing of an f1 signal were repeated ten thousand times, and after the recording and erasing of an f2 signal were repeated ten thousand times, the recording of an f1 signal was performed, and the CN ratio and the erasability were measured again.

(3) If the CN ratio was more than 50 dB, and if the erasability was more than 26 dB, after the repetition, and if the attenuation of the CN ratio from the initial value was less than 3 dB, then the judgment OK was passed; otherwise the judgment NG was passed.

(4) The above combination of laser power levels P1, and P2 was changed into other combinations of values, and the steps (1) to (3) were repeated.

(5) If the set of combinations of laser power levels P1, P2 such that judgment OK was passed in (3) spreads at least over an area of ±10% of certain values of P1 and P2, then evaluation o was given. If the set was an area of values between ±5% and ±10%, then evaluation Δ was given. If the set was an area of values less than ±5%, then evaluation x was given.

(6) Steps (1) to (5) were repeated for zones No. 2 to No. 10.

The results are shown in Table 14. As seen from Table 14, the prescribed characteristics were satisfied both in the grooves and on the lands of the whole area, where the ratio L/G of land width L to groove width G and G/L were at most 1.5, and the ratio O/I of the width of an outer groove or land O to the width of an inner groove or land I and I/O were at most 1.5.

EXAMPLE 8

Figure 13A:
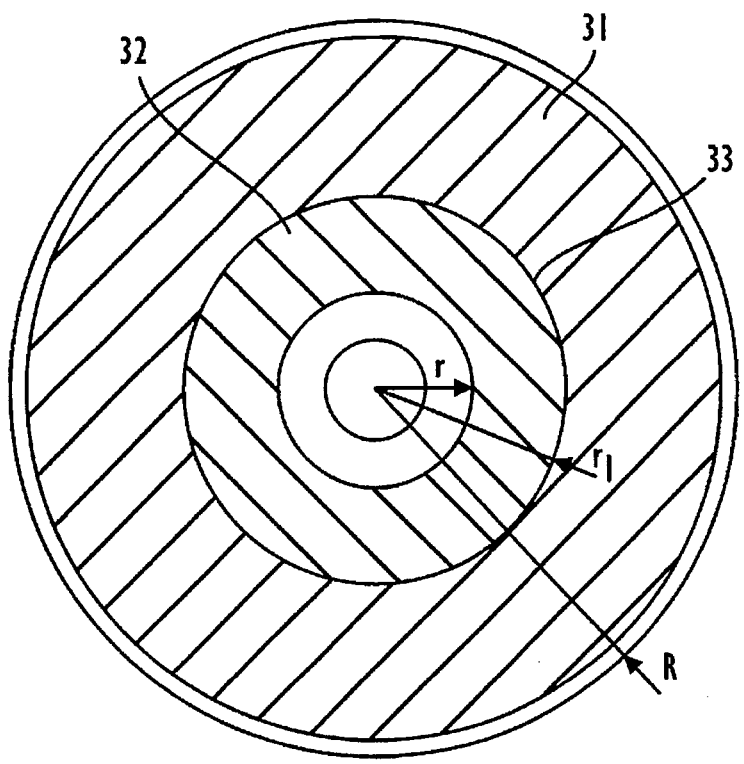
FIG. 13A shows an optical information recording medium of a further embodiment viewed from the recording surface side.

FIG. 13A shows an optical information recording medium according to a further embodiment of the present invention. This medium is designed to be an optical disk having a diameter of 300 mm for recording a large volume of information such as image information. Cross-sectional structure of this medium is substantially same as that shown in FIG. 2.

Namely, a substrate 1 of the optical disk has spiral or concentric groove (concave-convex) tracks formed on its surface 2. On substrate 1 are successively formed a first dielectric layer 4, a recording layer 5 made of a phase change material which reversibly changes its optical characteristics between the crystalline state and the amorphous state by laser irradiation, a second dielectric layer 6, a reflecting layer 7 made of a metal thin film and these layers are protected by a protecting plate 9 through an adhesive layer 8. A laser beam 10 for recording and reproduction is made incident on the substrate side. Each of these layers is formed using a sputtering apparatus for forming thin films. Similarly to the first embodiment, Ar gas is used as a sputtering gas, dielectric films are deposited using an RF magnetron sputtering and recording layer and reflecting layer are formed by DC sputtering. As a method for forming thin films, electron beam vapor deposition, ion beam sputtering, CVD, ion plating can be used depending on the material of the thin film. As the recording layer 5, phase change materials such as a Ge—Sb—Te system, a system obtained by adding Co, Bi, Pd, O, N, Se, and the like to that system or substituting these elements for part of that system, a Sb—Te system, an In—se system or a system obtained by adding Co and Ti and the like to that system, an In—Sb—Te system, a Ge—Te system, a Ag—Sb—In—Te system, a Ge—Bi—Te system, a Ge—Sn—Te system, a Ge—Bi—Te—Se system, a Ge—Te—Sn—Au system, or a system obtained by adding O and N and the like to one of these systems can be preferably used. Further, a photo-electro-magnetic recording film wherein orientation of spin on a vertically magnetized film made of rare earth element and transition metal can be detected utilizing Karr effect and/or a piercing type recording thin film such as an inorganic thin film including Te as a base material or an organic pigment recording film is also usable.

Dielectric layers 4, 6 are thin films of oxides such as SiO, $SiO_2$, $Ta_2O_5$, $TiO_2$, $ZrO_2$, nitrides such as BN, ALN, $Si_3N_4$, TiN, fluorides such as $CaF_2$, LaF, chalcogenides such as ZnS, ZnSe, PbS, carbides such as SiC, diamond, DLC, c-BN, or mixtures of them such as ZnS—$SiO_2$, ZnSe—$SiO_2$, SiNO.

Further, reflecting layer (thermal diffusion laser) 7 is a film of a single metal such as Au, Al, Cu, Ni, Cr, Ti, Si, or an alloy such as Au—Cr, Ni—Cr, Al—cr, Al—Ti, Al—Ta, Au—Si, Au—Cu, Cu—Si. Also, a dielectric material having higher thermal diffusivity can be used as reflecting layer 7. For example, DLC, c-BN, SiC and the like are suitable.

As stated above, various structures of recording media are possible and in other words, the present invention is independent of the multilayer structure of a recording medium.

Protecting layer 9 is usually made of the same material as used for the substrate to form a structure having vertical symmetry, but other material may be used. As adhesive layer 8 ultraviolet-hardening resin or hot-melt type material can be used.

FIG. 13A shows an optical disk medium of the present embodiment viewed from the recording surface side. In this figure, a hatched area 31 denotes a groove-recording area wherein information is recorded only in grooves and a cross-hatched area 32 denotes a land-recording area wherein information is recorded only on lands. The pitch p of groove track 2 is made constant at p=1.5 μm throughout from the radial location r to the radial direction R. Values of the pitch of concave-convex, groove width, and land width are dependent on various factors such as a wavelength of a laser used for recording and reproducing, N.A. of an objective lens and so on, and can be smaller as the wavelength of laser becomes shorter and as N.A. of the objective lens becomes larger. Anyway, the present invention is not limited to these values of the present embodiment. Also, boundary 33 between the groove recording area 31 and the land recording area 32 can be determined arbitrarily depending on the structure of the disk.

Figure 13B:
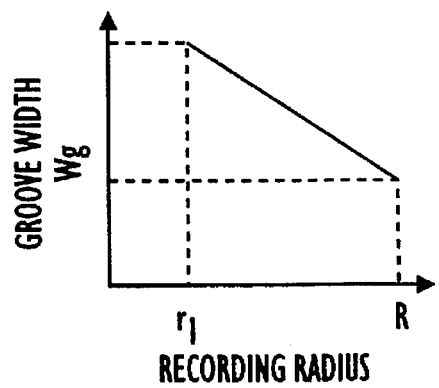
FIG. 13B shows a relation between the recording radius and the groove width Wg in the groove-recording area 31 of FIG. 13A.
Figure 13C:
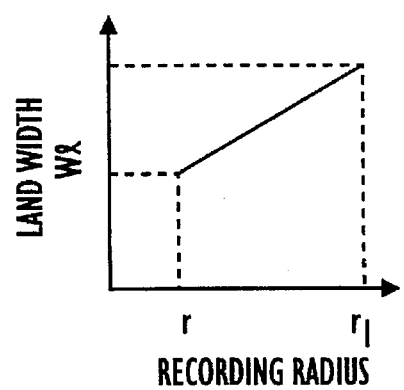
FIG. 13C shows a relation between the recording radius and the land width Wl in the land-recording area 32 of FIG. 13A.
Figure 14A:
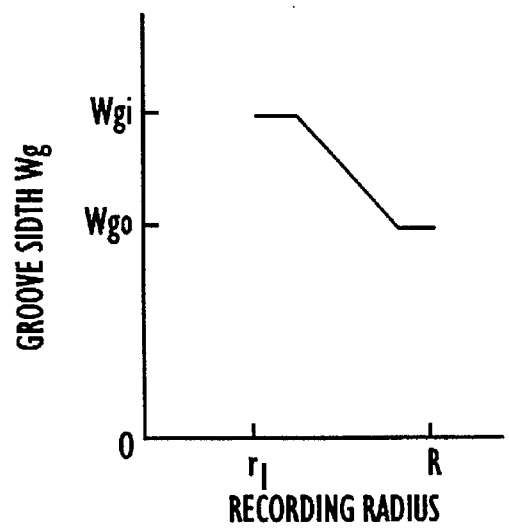
FIGS. 14A, 14B, 14C and 14D show some variations of groove width change in the groove-recording area 31 of FIG. 13A, respectively.
Figure 14B:
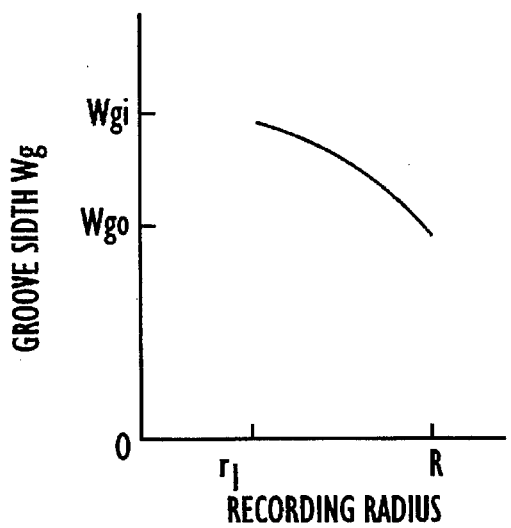
Figure 14C:
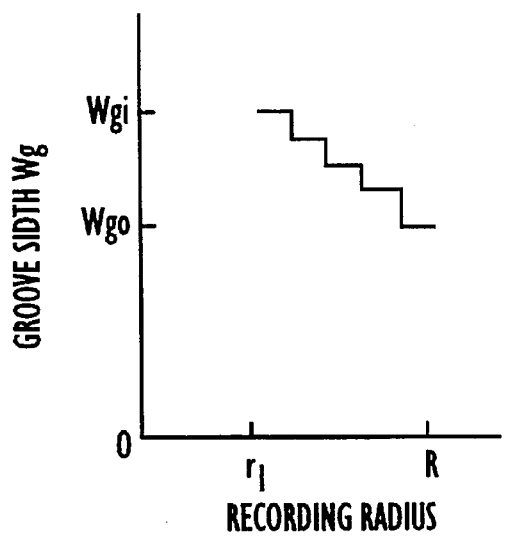
Figure 14D:
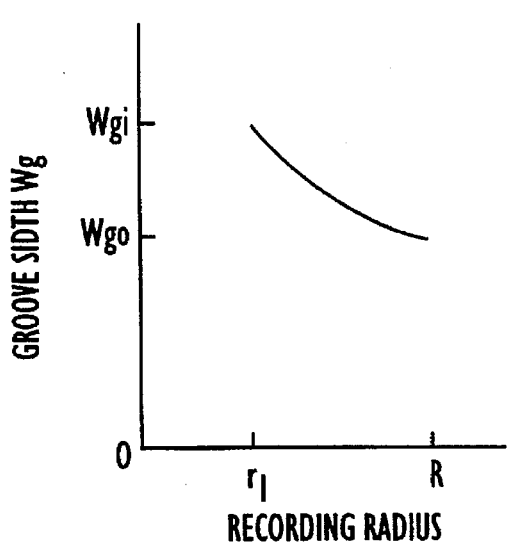
Figure 15A:
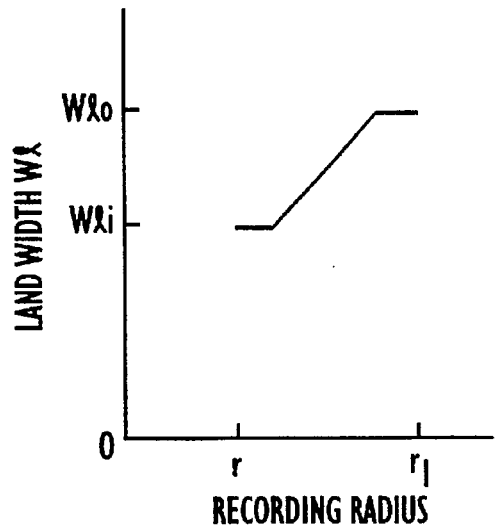
FIGS. 15A, 15B, 15C and 15D show some variations of land width change in the land-recording area 32 of FIG. 13A, respectively.
Figure 15B:
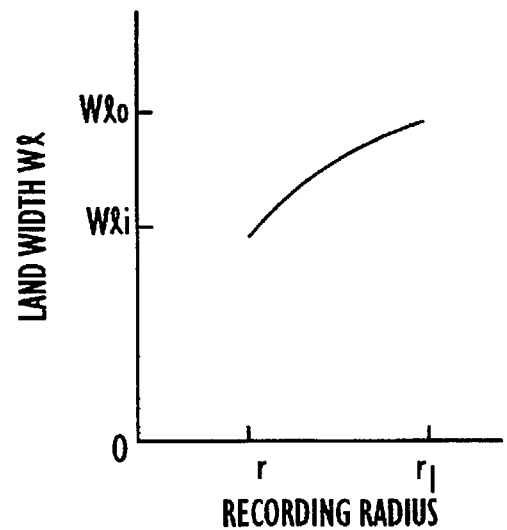
Figure 15C:
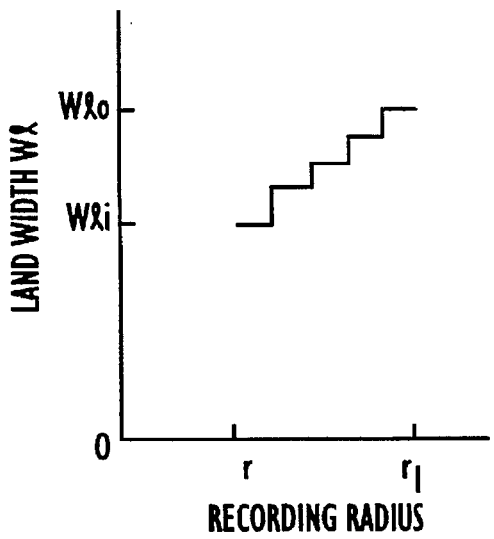
Figure 15D:
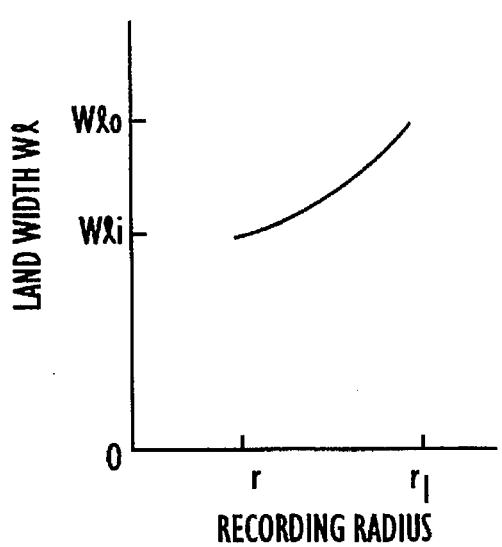

In the present embodiment, the groove width Wg in the groove recording area 31 is continuously widened from Wg=0.6 μm at the outermost part (recording radius of 145 mm) to Wg=0.9 μm at the innermost part (recording radius of 95 mm). However, the change of groove width is not necessarily linear as shown in the graph of FIG. 13B but may be curved or constant in some zones as shown in FIGS. 14A–14D. A pattern of the change may be chosen considering recording characteristics of the medium.

The land width Wl in the land recording area 32 is continuously narrowed from Wl=0.9 μm at the outermost part (recording radius of 95 mm) of the land recording area 32 to Wl=0.6 at the innermost part (recording radius of 55 mm). However, the land width Wl is not necessarily linear but may be curved or constant in some zones thereof as shown in FIGS. 15A to 15D. A pattern of the change in the land width is also chosen considering recording characteristics of the medium.

Next, experimental results of comparing over-writing characteristics of recording media of the present embodiment with those of prior recording media are described.

In order to compare an optical information recording medium of the present embodiment with prior ones, the recording area thereof is divided into 10 zones, the groove recording area 31 is divided into outer 5 zones and the land recording area 32 is divided into outer 5 zones. The groove width in the groove recording area 31 is widened from the outer zone to the inner zone and the land width in the land recording area 32 is widened from the outer zone to the inner zone (referred to as Disk I).

As disks to be compared, there were prepared an optical disk (Disk II) having uniform groove width among all zones and an optical disk (Disk III) having uniform land width among all zones. A phase change material made of a ternary alloy of a GeSbTe system was used as the recording film of each disk and the layer structures were the same for all of disks I, II and III each having the layer structures same as those of each disk 1, 2 or 3 in the first example mentioned above.

Recording characteristics were evaluated by the following procedure using the same apparatus as shown in FIG. 12 which was used in the first embodiment of the present invention.

(1) Recording in middle tracks of each zone was performed. First, a recording power level P1 and an erasing power level P2 were fixed to certain values, an f1 signal was recorded, and the CN ratio was measured. Also, the reflectance of the medium was determined from the integrals of the magnitudes of the focusing error signal and the tracking error signal over a revolution.

(2) Next, an f2 signal was overwritten with the same laser power, and the attenuation ratio of the f1 component and the erasability were measured.

(3) The above steps were repeated 10,000 cycles. If the change of reflectance was less than 10%, and if the CN ratio was more than 50 dB, and if the erasability was more than 20 dB after the repetition, then the judgment OK was passed; otherwise, the judgment NG was passed.

(4) The above combination of laser power levels P1 and P2 was changed into other combinations of values, and the steps (1) to (3) were repeated.

(5) If the set of combinations of laser power levels P1, P2 such that judgment OK was passed in (3) spreads at least over an area of ±10% of certain values of P1 and P2, then evaluation o (good) was given. If the set was an area of values between ±5% and ±10%, then evaluation Δ was given. If the set was an area of values less than ±5%, then evaluation x (bad) was given.

Results of evaluation is shown in Table 15.

TABLE 15

| | | Recording characteristics of Disks | | | | | |
|---|---|---|---|---|---|---|---|
| | | Disk I | | Disk II | | Disk III | |
| Radial location (mm) | | Groove Width (μm) | Evaluation | Groove Width (μm) | Evaluation | Land Width (μm) | Evaluation |
| Groove recording | 145 | 0.60 | o | 0.6 | o | 0.9 | x |
| | 135 | 0.67 | o | 0.6 | o | 0.9 | x |
| | 125 | 0.74 | o | 0.6 | o | 0.9 | x |
| | 115 | 0.81 | o | 0.6 | Δ | 0.9 | x |
| | 105 | 0.90 | o | 0.6 | Δ | 0.9 | Δ |
| Land recording | 95 | 0.67 | o | 0.6 | Δ | 0.9 | Δ |
| | 85 | 0.67 | o | 0.6 | x | 0.9 | Δ |
| | 75 | 0.74 | o | 0.6 | x | 0.9 | o |
| | 65 | 0.81 | o | 0.6 | x | 0.9 | o |
| | 55 | 0.90 | o | 0.6 | x | 0.9 | o |

From Table 15, it is seen that disk II having uniform groove width decreased its performance in inner zones and disk III having uniform land width decreased its performance in outer zones. On the other hand, disk I of the present embodiment having 10 zones including 5 zones for groove recording having the groove width increasing from the outer part to the inner part and 5 zones for land recording having the land width increasing from the outer part to the inner part achieved good performance throughout from the outermost to the innermost zones.

Thus, disks according to the present embodiment exhibit good recording characteristics even in a case such that recording information to an optical disk having a relatively large diameter such as 300 mm is performed in CAV method (the number of rotation is kept constant) which causes a large difference of linear speed three to four times as large as between the outermost part and the innermost part.

In order to control the groove recording and/or the land recording, a boundary radius for switching the groove recording to the land recording or vice versa is determined beforehand and a scan position by a laser beam is detected with a suitable detection means (not shown). The transfer control means controls the focus servo and the tracking servo in accordance with a detection signal output from the detection means so that the groove recording is performed in an area outside of the boundary radius and the land recording is performed in inside area thereof. It is also possible to switch between the groove recording and the land recording by providing plural optical heads for the groove recording and the land recording, respectively. In this case, it becomes unnecessary to change gains for tracking and focusing between the groove and land recordings since it becomes unnecessary to switch the laser beam between groove and land. This contributes to simplify for tracking control and servo control and, further, to prevent track jumps from occurring. Also, recording and reproducing can be speeded up since plural optical heads enable to record or reproduce information simultaneously. In the case of MCAV recording, it becomes possible to make the speed of recording and reproducing a signal faster and constant by setting a positional relationship among optical heads so that a radial distance between adjacent scan positions by adjacent optical heads becomes constant.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical information recording medium having a transparent substrate having concentric or spiral grooves with geometrically concave-convex structure, thereby forming concentric or spiral tracks each consisting of land and groove portions of said geometrically concave-convex structure, a dielectric layer, a rewritable recording film made of a material which undergoes a reversible phase change responding to a heat of a laser beam, and a reflecting layer for reflecting the laser beam back into said recording film, said reflecting layer being formed as a thermal diffusion layer for diffusing a heat transmitted from said recording film wherein the thermal diffusivity of each track located in a radially inner area of said recording medium is greater than that of each track located in a radially outer area.

2. The optical information recording medium as defined in claim 1 wherein the radial pitch of said tracks is constant.

3. The optical information recording medium as defined in claim 1 wherein information is recorded on respective grooves of said tracks and the groove width of tracks located in radially inner area of said recording medium is greater than that of those located in radially outer area.

4. The optical information recording medium as defined in claim 1 or 2 wherein information is recorded on respective grooves of said tracks and the groove width is increased monotonically in a radially inward direction of said optical information recording medium.

5. The optical information recording medium as defined in claim 1 wherein information is recorded on respective grooves of said tracks and the groove width is increased step wisely in a radially inward direction of said optical information recording medium.

6. The optical information recording medium as defined in claim 5 wherein the area in which said tracks are formed is divided into a plurality of concentric ring zones, and the groove width is constant in each concentric ring zone.

7. The optical information recording medium as defined in claim 3 or 4 wherein the ratio of the groove width of said tracks located in the radially innermost area to that of those located in the radially outermost area is less than 3 to 2.

8. The optical information recording medium as defined in claim 1 wherein information is recorded on respective lands of said tracks and the land width of tracks located in radially outer area of said recording medium is greater than that of those located in radially inner area.

9. The optical information recording medium as defined in claim 1 or 2 wherein information is recorded on respective lands of said tracks and the land width is increased monotonically in a radially outward direction of said optical information recording medium.

10. The optical information recording medium as defined in claim 1 or 2 wherein information is recorded on respective lands of said tracks and the land width is increased step wisely in a radially outward direction of said optical information recording medium.

11. The optical information recording medium as defined in claim 10 wherein the area in which said tracks are formed is divided into a plurality of concentric ring zones, and the land width is constant in each concentric ring zone.

12. The optical information recording medium as defined in claim 8 or 9 wherein the ratio of the land width of said tracks located in the radially outermost area to that of those located in the radially innermost area is less than 3 to 2.

13. The optical information recording medium as defined in claim 1 wherein information is recorded on both land and groove portions of said tracks, and the thermal diffusivities of adjacent land and groove portions are equal to each other.

14. The optical information recording medium as defined in claim 13 wherein a ratio of the land width to the groove width or vice versa does not exceed 1.5.

15. An optical information recording medium having a transparent substrate having concentric or spiral grooves with geometrically concave-convex structure, thereby forming concentric or spiral tracks each consisting of land and groove portions of said geometrically concave-convex structure, a dielectric layer, a rewritable recording film made of a material which undergoes a reversible phase change responding to a heat generated by a laser beam, and a thermal diffusion layer for diffusing a heat transmitted from said recording film through said dielectric layer, wherein the radial width of information recording portion of each track, on which information is recorded, is large in a radially inner area of said recording medium as compared with that in a radially outer area when the recording portion is groove portions, and is small in a radially inner area of said recording medium as compared with that in a radially outer area when the recording portion is land portions.

16. The optical information recording medium as defined in claim 15 wherein said thermal diffusion layer is a reflecting layer that reflects the laser beam passing through said recording film back into said recording layer.

17. The optical information recording medium as defined in claim 15 wherein information is recorded on both land and groove portions of each track, and the thermal diffusivities of adjacent land and groove portions are equal to each other.

18. The optical information recording medium as defined in claim 17 wherein a ratio of the land width to the groove width or vice versa does not exceed 1.5.

19. The optical information recording medium as defined in claim 15 wherein the radial pitch of said tracks is constant.

20. The optical information recording medium as defined in claim 15 wherein information is recorded on respective grooves of said tracks and the groove width is increased step wisely in a radially inward direction of said optical information recording medium.

21. The optical information recording medium as defined in claim 20 wherein the area in which said tracks are formed is divided into a plurality of concentric ring zones, and the groove width is constant in each concentric ring zone.

22. The optical information recording medium as defined in claim 15 wherein the ratio of the groove width of said tracks located in the radially innermost area to that of those located in the radially outermost area is less than 3 to 2.

23. The optical information recording medium as defined in claim 15 wherein information is recorded on respective lands of said tracks and the land width is increased step wisely in a radially outward direction of said optical information recording medium.

24. The optical information recording medium as defined in claim 23 wherein the area in which said tracks are formed is divided into a plurality of concentric ring zones, and the land width is constant in each concentric ring zone.

25. The optical information recording medium as defined in claim 15 wherein the ratio of the land width of said tracks located in the radially outermost area to that of those located in the radially innermost area is less than 3 to 2.

26. An optical information recording medium having a transparent substrate having concentric or spiral grooves with geometrically concave-convex structure, thereby forming concentric or spiral tracks each consisting of land and groove portions of said geometrically concave-convex structure, a dielectric layer, a rewritable recording film made of a material which undergoes a reversible phase change responding to a heat of a laser beam, and a reflecting layer for reflecting the laser beam back into said recording film, said reflecting layer being formed as a thermal diffusion layer for diffusing a heat transmitted from said recording film wherein the area in which said tracks are formed is divided into at least two concentric ring zones and information is recorded on groove portions of said tracks located in one zone of said at least two concentric ring zones and on land portions of said tracks located in another zone of said at least two concentric ring zones.

27. The optical information recording medium as defined in claim 26 wherein said one zone of said at least two concentric zones is located radially outside said another zone.

28. The optical information recording medium as defined in claim 26 wherein the groove width is increased monotonically in a radially inward direction in said one zone while the land width is increased monotonically in a radially outward direction in said another zone.

29. The optical information recording medium as defined in claim 26 wherein said one zone of said at least two concentric ring zones is divided into plural subzones and the groove width in each subzone is varied from that in another subzone while keeping the groove width constant in each subzone.

30. The optical information recording medium as defined in claim 29 wherein the groove width in one subzone is smaller than that in another subzone located in a radially inward direction.

31. The optical information recording medium as defined in claim 26 wherein said another zone of said at least two concentric ring zones is divided into plural subzones and the land width in each subzone is varied from that in another subzone while keeping the land width constant in each subzone.

32. The optical information recording medium as defined in claim 31 wherein the land width in one subzone is larger than that in another subzone located in a radially inward direction.

* * * * *

UNITED STATES PATENT AND TRADEMARK OFFICE
CERTIFICATE OF CORRECTION

PATENT NO.   : 5,635,267
DATED        : June 3, 1997
INVENTOR(S)  : YAMADA et al.

It is certified that error appears in the above-identified patent and that said Letters Patent is hereby corrected as shown below:

Col. 28, line 40:  Replace "26" with --27--

Signed and Sealed this

Fifteenth Day of December, 1998

Attest:

BRUCE LEHMAN

*Attesting Officer*    *Commissioner of Patents and Trademarks*